(12) United States Patent
Kuroda et al.

(10) Patent No.: US 9,396,189 B2
(45) Date of Patent: Jul. 19, 2016

(54) DEVICE AND METHOD FOR MANAGING STRUCTURED DOCUMENT, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Minato-ku, Tokyo (JP)

(72) Inventors: Yosuke Kuroda, Kanagawa (JP); Masakazu Hattori, Kanagawa (JP)

(73) Assignees: TOSHIBA SOLUTIONS CORPORATION, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 307 days.

(21) Appl. No.: 13/845,905

(22) Filed: Mar. 18, 2013

(65) Prior Publication Data
US 2014/0082020 A1    Mar. 20, 2014

Related U.S. Application Data

(63) Continuation of application No. PCT/JP2012/074011, filed on Sep. 20, 2012.

(51) Int. Cl.
*G06F 17/00* (2006.01)
*G06F 17/30* (2006.01)
*G06F 17/21* (2006.01)
*G06F 17/22* (2006.01)
*G06F 17/27* (2006.01)

(52) U.S. Cl.
CPC .......... *G06F 17/30011* (2013.01); *G06F 17/21* (2013.01); *G06F 17/2247* (2013.01); *G06F 17/2705* (2013.01); *G06F 17/30* (2013.01)

(58) Field of Classification Search
CPC ... G06F 17/30011; G06F 17/21; G06F 17/30; G06F 17/2247
See application file for complete search history.

(56) References Cited

U.S. PATENT DOCUMENTS 7,461,077 B1 * 12/2008 Greenwood .......... G06F 3/0482
7,975,220 B2    7/2011 Hattori
2004/0073541 A1 * 4/2004 Lindblad et al. .................. 707/3
(Continued)

OTHER PUBLICATIONS

Alon Y. Levy, Inderpal Singh Mumick, Yehoshua Sagiv; Query Optimization by Predicate Move-Around, in Bocca, et al. VLDB Conference, pp. 96-107, Santiago, Chile, 1994.
(Continued)

*Primary Examiner* — Tarek Chbouki
(74) *Attorney, Agent, or Firm* — Amin, Turocy & Watson LLP

(57) ABSTRACT

According to an embodiment, a structured document management device includes a parser; a constraint acquiring unit; and a parse tree rewriting unit. The structured document receiving unit is configured to receive an input of a structured document having a layered logical structure. The parser is configured to parse the syntax of received query data to acquire a parse tree in which the query data is decomposed so as to meet a static single assignment form which is defined such that each variable is assigned exactly once. The constraint acquiring unit is configured to acquire a hierarchical condition that the variables of the parse tree need to meet and constraints that include conditions for values of the respective variables. The parse tree rewriting unit is configured to rewrite the query data in such a form that the structured document is refinable by the constraints.

4 Claims, 14 Drawing Sheets

(56) References Cited

U.S. PATENT DOCUMENTS

| | | | |
|---|---|---|---|
| 2006/0112090 A1* | 5/2006 | Amer-Yahia | G06F 17/3053 |
| 2006/0206440 A1* | 9/2006 | Anderson et al. | 705/500 |
| 2007/0198559 A1* | 8/2007 | Hattori | 707/101 |
| 2007/0233645 A1* | 10/2007 | Peterson et al. | 707/3 |
| 2008/0222087 A1* | 9/2008 | Balmin et al. | 707/2 |
| 2008/0235252 A1* | 9/2008 | Sakai et al. | 707/100 |
| 2008/0240619 A1* | 10/2008 | Kanawa | 382/305 |
| 2010/0082587 A1 | 4/2010 | Hattori | |
| 2011/0302198 A1* | 12/2011 | Baby et al. | 707/769 |
| 2012/0136884 A1 | 5/2012 | Kanawa | |

OTHER PUBLICATIONS

Sven Groppe, Jinghua Groppe, Stefan Bottcher, Marc-Andre' Vollstedt; Shifting Predicates to Inner Sub-Expressions for XQuery Optimization; SITIS 2006, pp. 67-79.

Jens Teubner; Pathfinder: Compiling XQuery for Execution on the Monet Database Engine; 2003; pp. 1-5; Retrieved from the internet <URL:http://ceur-ws.ort/Vol-76/teubner.pdf>.

International Search Report for PCT/JP2012/074011 mailed on Dec. 4, 2012.

Written Opinion for PCT/JP2012/074011 mailed on Dec. 4, 2012.

* cited by examiner

FIG.4

```
<book year="1999">
 <title>Data on the Web</title>
 <author>
   <last>Suciu</last>
   <first>Dan</first>
 </author>
 <section>
   <p>Text ... </p>
   <p>XML and HTML ... </p>
 </section>
 <section>
   <p>XML ... </p>
   <p>HTML ... </p>
   <p>Text ... </p>
 </section>
</book>
```

FIG.5

```
<book year="1992">
 <title>TCP/IP Illustrated</title>
 <author>
   <last>Stevens</last>
   <first>Dan</first>
 </author>
 <author>
   <last>Suciu</last>
   <first>Peter</first>
 </author>
 <section>
   <p>Text ... </p>
   <p>XML and HTML ... </p>
 </section>
 <section>
   <p>XML ... </p>
   <p>HTML ... </p>
 </section>
</book>
```

FIG.6

```
<book year="1994">
  <title>Advanced Programming</title>
  <author>
    <last>Gerbarg</last>
    <first>Darcy</first>
  </author>
  <section>
    <p>XML ... </p>
    <p>HTML ... </p>
  </section>
</book>
```

FIG.7

```
[ L1]for $h in /book
[ L2]let $i :=
[ L3]      for $x in $h/author
[ L4]      let $u := $x/last
[ L5]      let $v := $x/first
[ L6]      where $u="Suciu" and $v="Dan"
[ L7]      return $x
[ L8]let $j :=
[ L9]      for $a in $h/section/p
[L10]      where contains($a,"XML")
[L11]      return $a
[L12]let $k := $h/@year
[L13]let $l := $h/title
[L14]where $i and $k <= 1999
[L15]return <item>{$l}{$i}<snippet>{$j}</snippet></item>
```

FIG.8

```
START
  ↓
RECEIVE QUERY DATA  ~S1
  ↓
PERFORM PARSING PROCESS  ~S2
  ↓
PERFORM CONSTRAINT ACQUIRING PROCESS  ~S3
  ↓
PERFORM PARSE TREE REWRITING PROCESS  ~S4
  ↓
PERFORM QUERY EXECUTION PROCESS  ~S5
  ↓
RETURN RESULT DATA TO CLIENT TERMINAL  ~S6
  ↓
END
```

FIG.9

```
[ L1]declare function udf1($h1) {
[ L2]  for $x in $h1/author
[ L3]  let $u := $x/last
[ L4]  let $v := $x/first
[ L5]  let $y := $u="Suciu"
[ L6]  let $z := $v="Dan"
[ L7]  let $w := $y and $z
[ L8]  where $w
[ L9]  return $x
[L10]}
[L11]declare function udf2($h2) {
[L12]  for $a in $h2/section/p
[L13]  let $b := contains($a,"aML")
[L14]  where $b
[L15]  return $a
[L16]}
[L17]let $g := /
[L18]for $h in $g/book
[L19]let $i := udf1($h)
[L20]let $j := udf2($h)
[L21]let $k := $h/@year
[L22]let $l := $h/title
[L23]let $m := $k <= 1999
[L24]let $n := $i and $m
[L25]let $o := <item>{$l}{$i}<snippet>
                  {$j}</snippet></item>
[L26]where $n
[L27]return $o
```

FIG.13

```
[ 1]C($h)=C($g)
[ 2]C($h1)=C($h)
[ 3]C($h2)=C($h)
[ 4]C($k)=C($h)
[ 5]C($l)=C($h)
[ 6]C($m)=C($k)∧C($k <= 1999)
[ 7]C($a)=C($h2)
[ 8]C($b)=C($a)∧C(contains($a, "XML"))
[ 9]C($x)=C($h1)
[10]C($u)=C($x)
[11]C($v)=C($x)
[12]C($i)=C($x)
[13]C($z)=C($v)∧C($v="Dan")
[14]C($y)=C($u)∧C($u="Suciu")
```

FIG.14

```
[ 1]P($h)=/book
[ 2]P($k)=/book/@year
[ 3]P($l)=/book/title
[ 4]P($a)=/book//section/p
[ 5]P($x)=/book/author
[ 6]P($u)=/book/author/last
[ 7]P($v)=/book/author/first
```

```
[ 1]C($g)=($k <= 1999)∧($v="Dan")∧($u="Suciu")
[ 2]C($h)=($k <= 1999)∧($v="Dan")∧($u="Suciu")
[ 3]C($i)=($k <= 1999)∧($v="Dan")∧($u="Suciu")
[ 4]C($k)=($k <= 1999)∧($v="Dan")∧($u="Suciu")
[ 5]C($l)=($k <= 1999)∧($v="Dan")∧($u="Suciu")
[ 6]C($m)=($k <= 1999)∧($v="Dan")∧($u="Suciu")
[ 7]C($h1)=($k <= 1999)∧($v="Dan")∧($u="Suciu")
[ 8]C($x)=($k <= 1999)∧($v="Dan")∧($u="Suciu")
[ 9]C($u)=($k <= 1999)∧($v="Dan")∧($u="Suciu")
[10]C($v)=($k <= 1999)∧($v="Dan")∧($u="Suciu")
[11]C($y)=($k <= 1999)∧($v="Dan")∧($u="Suciu")
[12]C($z)=($k <= 1999)∧($v="Dan")∧($u="Suciu")
[13]C($h2)=($k <= 1999)∧($v="Dan")∧($u="Suciu")
[14]C($a)=($k <= 1999)∧($v="Dan")∧($u="Suciu")∧(contains($a, "XML")
[15]C($b)=($k <= 1999)∧($v="Dan")∧($u="Suciu")∧(contains($a, "XML")
```

FIG.17

| TEMPLATE NAME | BASE TEMPLATE | PARAMETER |
|---|---|---|
| TP1 | declare variable $[X] := [Y][.[Z][V]]<br>declare variable $[W] := $[X]/fn:root(.) | [X]: NEW VARIABLE NAME<br>[Y]: STRUCTURAL CONDITION P($e) OF VARIABLE $e DESCRIBED IN INPUT CONDITION d<br>[Z]: COMPARISON OPERATOR OF INPUT CONDITION d<br>[V]: COMPARISON VALUE OF INPUT CONDITION d<br>[W]: NEW VARIABLE NAME |
| TP2 | let $[X] := $[Y] intersect $[Z] | [X]: VARIABLE NAME THAT STORES EXPRESSION IN WHICH INPUT CONDITION d IS DESCRIBED<br>[Y]: VARIABLE DESCRIBED IN INPUT CONDITION d<br>[Z]: OUTPUT VARIABLE [X] OF TP1 |
| TP3 | declare variable<br>$[X] := $[e[1]] $\sum_{i=2}^{n}$ (intersect $[e[i]]) | [X]: NEW VARIABLE NAME<br>[n]: ELEMENT NUMBER IN INPUT LIST E<br>[e[1]...e[n]]: ELEMENTS IN INPUT LIST |
| TP4 | [fn:root(.) intersect $[X]] | [X]: OUTPUT VARIABLE [W] OF TP1 |

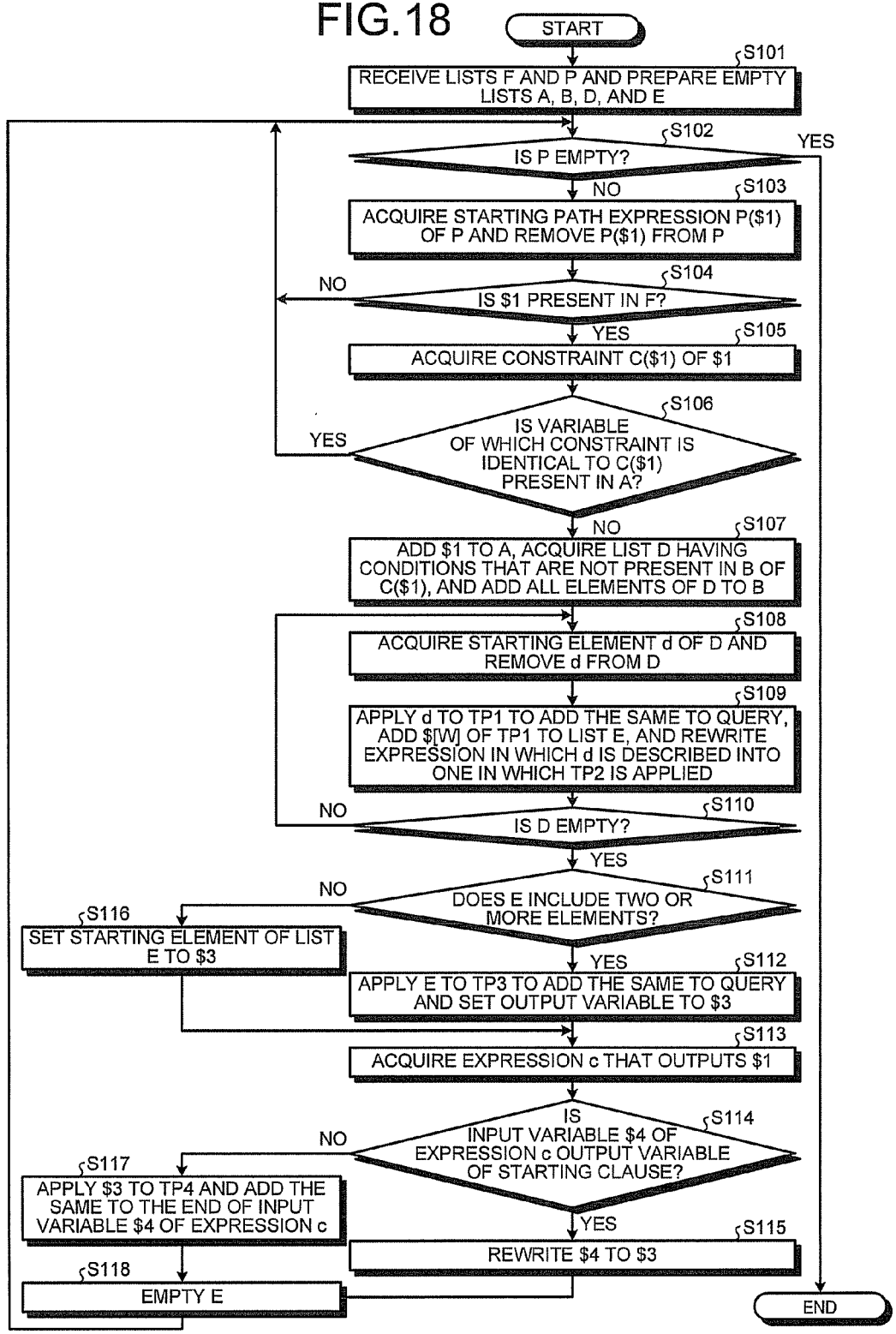

FIG.19

```
[L1] declare variable $1 := /book/
     @year[>=1999]
[L2] declare variable $1_root := $1/fn:root(.)
[L3] declare variable $2 :=
        /book/author/first[.="Dan"]
[L4] declare variable $2_root := $2/fn:root(.)
[L5] declare variable $3 :=
        /book/author/last[.="Suciu"]
[L6] declare variable $3_root := $3/fn:root(.)
[L7] declare variable $4_root :=
        $1_root intersect $2_root intersect $3_root
[L8] declare variable $5 :=
        /book/section/p[contains(., "XML")]
[L9] declare variable $5_root := $5/fn:root(.)
[L10] declare variable $6_root :=
        $4_root intersect $5_root
[L11] declare function udf1($h1) {
[L12]   for $x in $h1/author
[L13]   let $u := $x/last
[L14]   let $v := $x/first
[L15]   let $y := $u intersect $3
[L16]   let $z := $v intersect $2
[L17]   let $w := $y and $z
[L18]   where $w
[L19]   return $x
[L20] }
[L21] declare function udf2($h2) {
[L22]   for $a in
          h2[fn:root(.) intersect $6_root]
          /section/p
[L23]   let $b := $a intersect $5
[L24]   where $b
[L25]   return $a
[L26] }
[L27] let $g := /
[L28] for $h in $4_root/book
[L29] let $i := udf1($h)
[L30] let $j := udf2($h)
[L31] let $k := $h/@year
[L32] let $l := $h/title
[L33] let $m := $k intersect $5
[L34] let $n := $i and $m
[L35] let $o := <item>{$l}{$i}<snippet>
                 {$j}</snippet></item>
[L36] where $n
[L37] return $o
```

FIG.20

```
<item>
<title>Data on the Web</title>
 <author>
   <last>Suciu</last>
   <first>Dan</first>
 </author>
 <snippet>
   <p>XML and HTML ... </p>
 </snippet>
</item>
```

DEVICE AND METHOD FOR MANAGING STRUCTURED DOCUMENT, AND COMPUTER PROGRAM PRODUCT

CROSS-REFERENCE TO RELATED APPLICATION

This application is a continuation of PCT international Application Ser. No. PCT/JP2012/074011, filed on Sep. 20, 2012, which designates the United States; the entire contents of which are incorporated herein by reference.

FIELD

Embodiments described herein relate generally to a structured document management device, a structured document management method, and computer program product.

BACKGROUND

In the related art, a structured document management device for storing and searching for structured document data described in an extensible markup language (XML) or the like is known. To allow a structured document management device to search for structured document data, like a query language SQL in a relational database management system (RDBMS), an XML query language (XQuery) for XML data is defined and is supported in many structured document management devices.

XQuery is a language for treating an XML dataset like a database, and means for acquiring, aggregating, and analyzing a dataset that meets certain conditions are provided. Since XML data has a layered logical structure (hierarchical structure) in which elements such as a parent, a child, or siblings are combined, conditions (structural conditions) for this hierarchical structure can be designated as conditions.

A search technique that checks whether XML meets designated structural conditions is provided by simple API for XML (SAX) or the like, which is a typical parse process for XML data. However, according to SAX, in a structured document (in this example, XML) to be searched for, it is only possible to access a lower layer from a higher layer. Thus, when there is a refining condition that is designated on a lower layer, it is not possible to apply the refining condition unless the lower layer is traced. Thus, it is necessary to trace from the top layers of all structured documents to the lower layers when there is a refining condition.

In order to accelerate a search process of a structured document management device, it is preferable to apply the refining condition as early as possible to reduce intermediate data that is produced during the search. Thus, a technique that searches for a structural condition for only a structured document set that is refined using an indexing process is also known. However, this technique is not compatible with a nested query in which the query is made up of a plurality of subqueries.

As for the nested query, various attempts have been made so as to apply a refining condition over subqueries at an early stage. For example, in an RDB model, a technique in which the relation between subqueries that constitute a query is defined in a graph form, a condition for allowing a predicate to be moved between graphs is defined, and if possible, the predicate is moved to another subquery to achieve optimization is known.

However, the RDB model does not have a problem associated with a hierarchical structure and an order relation between elements unlike the structured document data model and does not support element identifier (ID). Thus, there is a case where the approach to rewrite queries in the RDB cannot be applied to the structured document.

Moreover, in queries of XML which is a structured document, by copying conditions for a virtual XML document called a view immediately before and after creating the view and applying the conditions, it may be possible to eliminate the need to unnecessarily trace the elements of the view of the structured document. However, besides the fact that the target is limited to the view, since the target conditions are simply copied to all possible locations at the stage of creating the view and are applied, the same conditions are evaluated at a plurality of locations. Further, when there is a plurality of copying conditions, since the logical sum of the predicative conditions are copied unconditionally, there is a problem in that the effect of refinement by the predicative conditions is not sufficient. An object of the present invention is to provide a structured document management device, method, and program capable of searching at a high speed.

BRIEF DESCRIPTION OF THE DRAWINGS

FIG. 4 is an explanatory diagram illustrating an example of structured document data that is registered in a structured document DB according to the embodiment;

FIG. 5 is an explanatory diagram illustrating an example of structured document data that is registered in the structured document DB according to the embodiment;

FIG. 6 is an explanatory diagram illustrating an example of structured document data that is registered in the structured document DB according to the embodiment;

FIG. 7 is an explanatory diagram illustrating an example of query data according to the embodiment;

FIG. 8 is a flowchart illustrating a flow of a search process according to the embodiment;

FIG. 9 is an explanatory diagram illustrating a result of a parsing process on query data according to the embodiment;

FIG. 13 is an explanatory diagram illustrating a list of constraints obtained through the input-to-output constraint acquiring process on query data according to the embodiment;

FIG. 14 is an explanatory diagram illustrating a path information list obtained through the input-to-output constraint acquiring process on query data according to the embodiment;

FIG. 15 is an explanatory diagram illustrating a constraint acquisition target variable list obtained through the input-to-output constraint acquiring process on query data according to the embodiment;

FIG. 16 is an explanatory diagram illustrating the list of constraints obtained through the output-to-input constraint acquiring process on query data according to the embodiment;

FIG. 17 is an explanatory diagram illustrating an example of a rewriting template used during rewriting according to the embodiment;

FIG. 18 is a flowchart illustrating a flow of a structural analysis tree rewriting process according to the embodiment;

FIG. 19 is an explanatory diagram illustrating a parse tree obtained through the structural analysis tree rewriting process on query data according to the embodiment; and FIG. 20 is an explanatory diagram illustrating a search result on query data according to the embodiment.

DETAILED DESCRIPTION

According to an embodiment, a structured document management device includes a structured document receiving unit; a structured document storage unit; a query data receiving unit; a query data receiving unit; a parser; a constraint acquiring unit; a parse tree rewriting unit; and a query execution unit. The structured document receiving unit is configured to receive an input of a structured document having a layered logical structure. The structured document storage unit is configured to store the input structured document. The query data receiving unit is configured to receive an input of query data. The parser is configured to parse the syntax of the received query data to acquire a parse tree in which the query data is decomposed so as to meet a static single assignment form which is defined such that each variable is assigned exactly once. The constraint acquiring unit is configured to acquire a hierarchical condition that the variables of the parse tree need to meet and constraints that include conditions for values of the respective variables, from the parse tree obtained by the parser. The parse tree rewriting unit is configured to rewrite the query data in such a form that the structured document is refinable by the constraints, based on the constraints obtained by the constraint acquiring unit. The query execution unit is configured to output a search result in response to the query data as an input that is rewritten by the parse tree rewriting unit.

Hereinafter, a structured document management device, a structured document search method, and a structured document management program according to an embodiment will be described with reference to the drawings.

Figure 1:
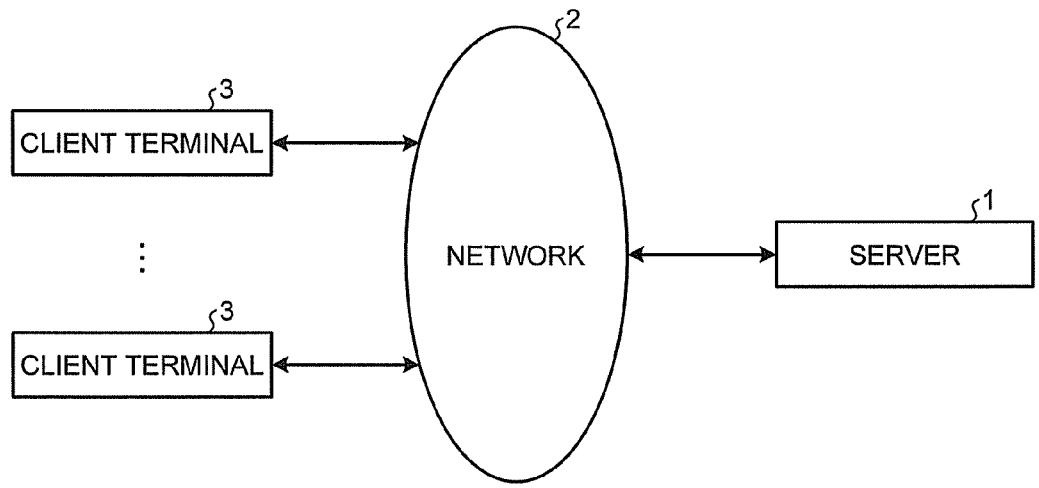
FIG. 1 is a schematic view illustrating a system establishment example of a structured document management system according to an embodiment.

FIG. 1 is a schematic view illustrating a system establishment example of the structured document management system according to the embodiment. As illustrated in FIG. 1, it is assumed that the structured document management system according to this embodiment is a server-client system in which a plurality of client computers (hereinafter, referred to as client terminals) 3 are connected to a server computer (hereinafter, referred to as a server) 1 which is a structured document management device via a network 2 such as a local area network (LAN).

Figure 2:
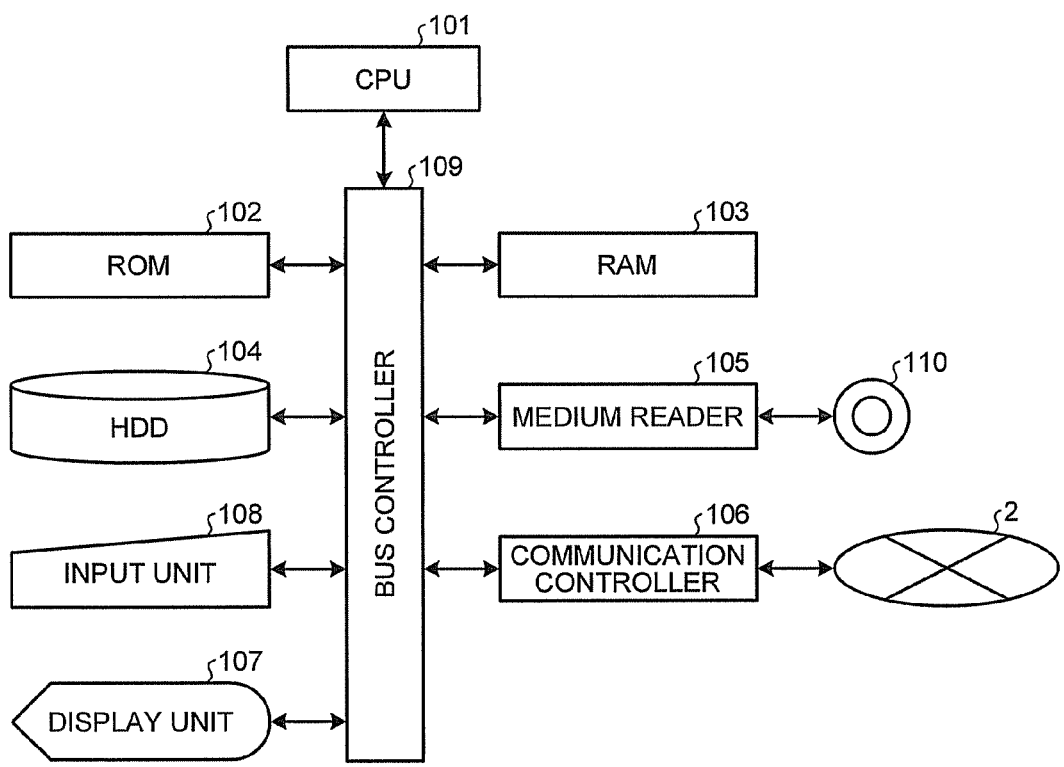
FIG. 2 is a module configuration diagram of a server and a client terminal according to the embodiment.

FIG. 2 is a module configuration diagram of the server 1 and the client terminal 3. For example, the server 1 and the client terminal 3 have a hardware configuration which uses a general computer. That is, the server 1 and the client terminal 3 include a central processing unit (CPU) 101 that processes information, a read only memory (ROM) 102 which is a read only memory that stores a BIOS and the like, a random access memory (RAM) 103 that stores various items of data in a rewritable manner, a hard disk drive (HDD) 104 that functions as various databases and stores various programs, a medium driver 105 such as a CD-ROM drive for storing information, distributing information to the outside, and obtaining information from the outside using a storage medium 110, a communication controller 106 used for transferring information to another external computer via the network 2 by communication, a display unit 107 such as a cathode ray tube (CRT) or a liquid crystal display (LCD) that displays a progress, a result, and the like of processing to an operator, an input unit 108 such as a keyboard or a mouse, which allows the operator to input commands, information, and the like to the CPU 101, and the like. The server 1 and the client terminal 3 transmit and receive the data between these respective components under the control of a bus controller 109.

When the user powers on the server 1 and the client terminal 3, the CPU 101 activates a program called a loader in the ROM 102 to read a program called an operating system (OS), which manages hardware and software of a computer, from the HDD 104 into the RAM 103, and to activate the OS. Such an OS activates a program and reads and stores information according to an operation of the user. As a typical OS, Windows (registered trademark), UNIX (registered trademark), and the like are known. Programs running on such an OS are called application programs. Application programs are not limited to those running on a predetermined OS, and may be those which cause the OS to take over execution of part of various types of processing described below and those which are included as a part of a group of program files that constitutes predetermined application software, an OS, or the like.

Here, the server 1 stores a structured document management program in the HDD 104 as an application program. In this sense, the HDD 104 functions as a storage medium that stores the structured document management program. Moreover, in general, an application program installed in the HDD 104 of the server 1 is provided in a state of being recorded on the storage medium 110 such as media of various schemes, for example, various types of optical disks such as a CD-ROM and a DVD, various types of magneto-optical disks, various types of magnetic disks such as a flexible disk, and semiconductor memories. Thus, the portable storage medium 110 such as an optical information recording medium (for example, a CD-ROM) or a magnetic medium (for example, an FD) can be a storage medium that stores the structured document management program. Further, the structured document management program may be imported, for example, from the outside via the communication controller 106 and installed in the HDD 104.

In the server 1, when the structured document management program running on the OS is activated, the CPU 101 intensively controls the respective components by executing various types of arithmetic processing according to the structured document management program. On the other hand, in the client terminal 3, when an application program running on the OS is activated, the CPU 101 intensively controls the respective components by executing various types of arithmetic processing according to the application program. Among various types of arithmetic processing executed by the CPU 101 of the server 1 and the client terminal 3, characteristic processing of the structured document management system according to the embodiment will be described below.

Figure 3:
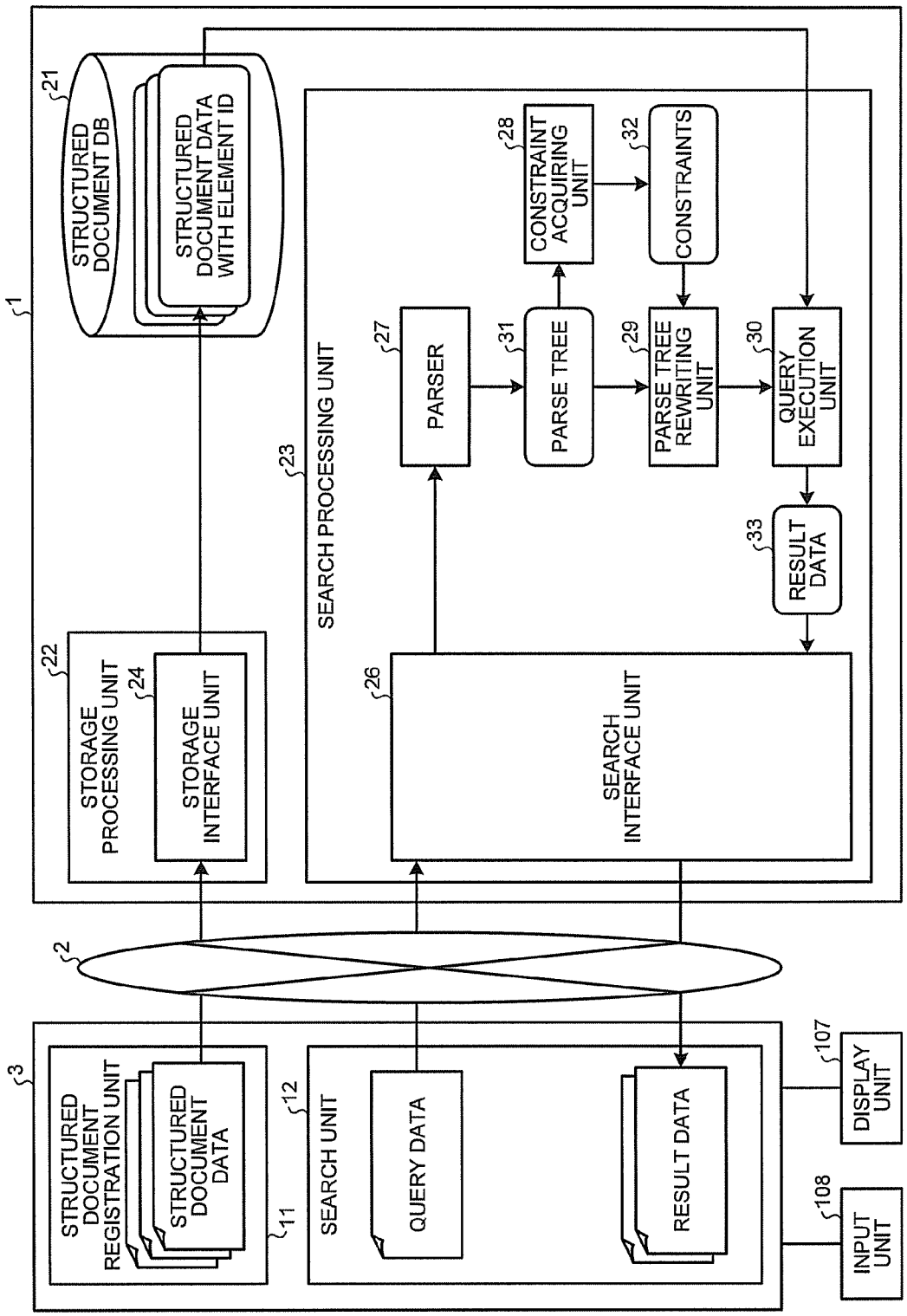
FIG. 3 is a block diagram illustrating a general configuration of the server and the client terminal according to the embodiment.

FIG. 3 is a block diagram illustrating a general configuration of the server 1 and the client terminal 3 according to this embodiment. As illustrated in FIG. 3, the client terminal 3 includes a structured document registration unit 11 and a search unit 12 as functional configurations that are realized by the application program.

The structured document registration unit 11 registers structured document data input from the input unit 108 and structured document data stored in advance in the HDD 104 of the client terminal 3 in a structured document database (structured document DB) 21 of the server 1, which will be described below. The structured document registration unit 11 sends a storage request to the server 1 together with the structured document data to be registered.

FIGS. 4 to 6 illustrate examples of structured document data that is registered in the structured document DB. Extensible Markup Language (XML) is a typical language for describing the structured document data. The three items of structured document data illustrated in FIGS. 4 to 6 are described in XML. In XML, individual parts that constitute a document structure are referred to as "elements", and the elements are described using tags. Specifically, one element is expressed in such a way that data is surrounded by two tags which include a tag (start-tag) that indicates the start of an element and a tag (end-tag) that indicates the end of the element. Text data surrounded by the start-tag and the end-tag is a text element included in one element that is represented by the start-tag and the end-tag. It should be noted that a document element that is not described as a tag is present at top of a structured document, and only one element is always present under the document element.

In the example illustrated in FIG. 4, a structured document D1 has an element which is surrounded by <book> tags and is present under a document element. The <book> element includes a year attribute and a plurality of child elements that is surrounded by <title>, <author>, and <section> tags. The <title> element includes a text element such as "Data On The Web". The <author> element includes two child elements that appear in the order of <last> and <first>. The <section> element includes a plurality of child elements surrounded by <p> tags.

The examples illustrated in FIGS. 5 and 6 also have elements in the same format as that of FIG. 4, except that the number of <author> elements and <section> elements and the element values are different.

Returning to FIG. 3, the search unit 12 creates query data that describes search criteria or the like for searching for desired data from the structured document DB 21 according to an instruction of the user input from the input unit 108 and sends a search request including the query data to the server 1. Moreover, the search unit 12 receives result data corresponding to the search request sent from the server 1 and displays the result data on the display unit 107.

On the other hand, the server 1 includes a storage processing unit 22 and a search processing unit 23 as functional configurations that are realized by the structured document management program. Moreover, the server 1 includes the structured document DB 21 which uses a storage device such as the HDD 104.

The storage processing unit 22 includes a storage interface unit 24 that receives a storage request from the client terminal 3 and stores structured document data sent from the client terminal 3 in the structured document DB 21.

The storage interface unit 24 (structured document receiving unit) receives the input of structured document data and stores the structured document data in the structured document DB 21 (structured document storage unit).

The search processing unit 23 performs a process of receiving a search request from the client terminal 3, finding data that meets conditions designated by query data from the structured document DB 21, and returning the found data as result data. The search processing unit 23 includes a search interface unit 26, a parser 27, a constraint acquiring unit 28, a parse tree rewriting unit 29, and a query execution unit 30.

The search interface unit 26 (query data receiving unit) receives the input of query data and calls the parser 27 that analyzes the syntax of the received query data to create a parse tree 31.

The parser 27 performs syntactic analysis on the query data (hereinafter referred to as input query data) which is sent from the client terminal 3 and input via the search interface unit 26, decompose the input query data so that one operation unit is always assigned to the variable of "for" or "let" clause of XQuery to generate a rewritten parse tree 31. That is, the parse tree 31 is decomposed syntax that meets a static single assignment form which is defined such that each variable is assigned only once.

The constraint acquiring unit 28 functions as a constraint acquiring unit, and is configured to trace all associated operations using, as a starting point, a variable that stores "/" that designates a set of document elements of all structured documents in a structured document device in the parse tree 31 output from the parser 27 to relax hierarchical conditions of the structured document and extract and output the constraints 32 of each variable.

The parse tree rewriting unit 29 is configured to rewrite the parse tree 31 output by the parser 27 based on the constraints 32 output by the constraint acquiring unit 28. The rewritten parse tree 31 is output in a format according to the XQuery grammar similarly to input query data.

The query execution unit 30 is configured to execute the rewritten query data output from the parse tree rewriting unit 29 with respect to the dataset of the structured document data to obtain result data 33 and output the result data 33.

The search interface unit 26 returns the result data output from the query execution unit 30 to the client terminal 3 as search result data.

In this embodiment, query data described in XQuery will be described. In XML, a query language called XQuery is proposed by the W3C, and XQuery can be basically described by a Prolog portion and the remaining syntax pattern which includes for-let-where-orderby-return (FLWOR) clauses. Hereinafter, the language specifications of XQuery will be described. Only one Prolog portion is present at the start of one XQuery and includes a declare variable clause and a declare function clause which are used in common to XQuery. The syntax of the declare variable clause is "declare variable:=expression". The variable declaration is the same as a let clause described below except that it can be referenced from any position in the XQuery.

The syntax of the declare function clause is "declare function name (argument declaration) {expression}", and an optional number of variables and types are described in an argument declarative portion. The declare function can be called at any position in the XQuery. The syntax of the for clause is "for variable in expression". The for clause has a meaning that elements in a sequence that meet the expression are assigned to a variable and a loop operation is performed. Here, the sequence is a flat list. The syntax of the let clause is "let variable:=expression". The let clause stores a sequence that meets the expression for each loop. The syntax of the where clause is "where expression". The where clause limits the loop that is repeated for the for clause and skips a loop if the expression is not met.

The syntax of the orderby clause is "order by expression". The orderby clause sorts the results obtained by the for-let-where clauses by a key that is designated by the expression. The syntax of the return clause is "return expression". The return clause can describe optional XML data that includes variables. The FLWOR clauses can be described in the expression.

Moreover, when the FLWOR clauses are described further in the expression of the for and let clauses and the like, this is called a nested query. The syntax of variable is "$character string". Variables having the same character string are considered to be the same unless the variable is declared doubly with a nested query or the like.

The XQuery defines the following operations for designating hierarchical conditions between elements of XML data.

A "/" operator represents that elements have a parent-child relationship.

A "//" operator represents that elements have an ancestor-descendant relationship.

When nothing is present to the left of the "/" or "//" operator, a document element of an XML or an XML set that is indicated by a DB or a program by default becomes the target of the "/" or "//" operator. In this embodiment, a structured document set of a structured document DB is the target of the "/" or "//" operator.

FIG. 7 is an explanatory diagram illustrating an example of the query data of XQuery. For better understanding, a line number surrounded by [ ] is assigned to each line of FIG. 7. FIG. 7 illustrates the following query data Q1 which aims to "find a book title, an author name, and a section which includes "XML" by the book content among books which have been published before 1999 of which the author has the last name of "Suciu" and the first name of "Dan".

Q1: [L1] is a for clause which represents an operation in which a "book" element on a layer immediately under a document element is acquired for each structured document data of the structured document DB 21 and is assigned to a variable $h, and a loop operation is performed. The let clause on [L2] is a nested query which represents an operation of storing the results of the FLWOR clauses on [L3] to [L7] in a variable $i. [L3] represents an operation in which an "author" element which is a child element of the element stored in the variable $h that is assigned in the loop on [L1] is acquired and is assigned to a variable $x, and a loop operation is performed. [L4] and [L5] represent an operation in which "last" and "first" elements which are child elements of the element stored in the variable $x that is assigned in the loop on [L3] are acquired and are assigned to $u and $v. [L6] represents an operation of performing a loop operation for only the variables $u and $v corresponding to the loop variable $x in which the value of the variable $u is the same as "Suciu" and the value of the variable $v is the same as "Dan". [L7] represents an operation of returning only the variable $x that meets [L6].

[L8] includes a let clause which is a nested query similarly to [L2] and represents an operation of storing the results of the FLWOR clauses on [L9] to [L11] in a variable $j. [L9] represents an operation in which a "p" element which is a child element of a "section" element which is a child element of the element stored in the variable $h that is assigned in the loop on [L1] is acquired and is assigned to a variable $a, and a loop operation is performed. [L10] represents an operation of performing a loop operation for only the loop variable $a in which the value of the variable $a includes "XML". [L11] represents an operation of returning only the variable $a that meets the condition of the clause [L10].

[L12] and [L13] are let clauses and represent an operation of acquiring a "year" attribute and a "title" element which is a child element of the element stored in the variable $h and assigning the "year" attribute and the "title" element to variables $k and $l as a sequence. [L14] represents an operation of performing a loop operation for only the variables $i and $k corresponding to the loop variable $h in which an element is present in the sequence of the variable $i and the value of the variable $k is equal to or smaller than 1999. [L15] represents an operation of embedding the values indicated by the three $l, $i, and $j variables obtained up to now at a designated position of the XML that starts with <item> to generate a new XML and returning the XML as results.

FIG. 8 is a flowchart illustrating the flow of a search process by the search processing unit 23 of the server 1. First, the search interface unit 26 receives the input of query data sent from the client terminal 3 via the network 2 (step S1).

Subsequently, the parser 27 analyzes the syntax for the input query data to generate a parse tree (step S2). In the syntactic analysis, elements that constitute the query data are decomposed so that each element is stored in the for or let clause using all operations that constitute XQuery as one operation unit. Moreover, the where, orderby, and return clauses are rewritten so that each clause accepts only one variable.

However, structural conditions of which the expressions start with a "/" or "//" operator are decomposed into a let clause (hereinafter referred to as a start-clause) that stores only the starting "/" or "//" operator as an expression and an expression in which an output variable of the let clause is used as an input variable. Moreover, when operations which start with a "variable" and are followed by hierarchical conditions that are designated by a "/" or "//" operator are continuously arranged, the operations are put together as one operation and are stored in a for or let clause. Further, when a nested query is present, a declare function described by the FLWOR clauses of the nested query is described by a Prolog portion of XQuery, and the described declare function is rewritten into such a form of a function call described in a source location such that a variable of a parent query passed to the nested query is used as an argument.

FIG. 9 illustrates the results of syntactic analysis on the query data of FIG. 7, performed by the parser 27. The query data is described in 27 lines from [L1] to [L27]. [L1] to [L10] in FIG. 9 are the nested query on [L3] to [L7] of FIG. 7 which is clipped as a declare function udf1. Since a variable $h on [L3] of FIG. 7 is a variable that is assigned in the for clause [L1] in the parent query of the nested query, the variable $h is used as an argument input variable $h1 in the declare function.

In the syntactic analysis, since elements are clipped for one operation unit so as to be stored in the let clause, and are rewritten so that only variables are input to the where clause, [L6] in FIG. 7 is rewritten to [L5] to [L8] in FIG. 9.

Moreover, [L11] to [L16] in FIG. 9 are the nested query on [L9] to [L11] in FIG. 7 which is clipped as a declare function udf2. In the syntactic analysis, since elements are rewritten so that only variables are input to the where clause, [L10] in FIG. 7 is rewritten to [L13] to [L14] in FIG. 9.

[L17] to [L18] in FIG. 9 are [L1] in FIG. 7, in which elements are decomposed into a start-clause in which the starting "/" operator is solely clipped as a let clause and is assigned to the variable $g, and a for clause which is the remaining portion of the subsequent expression using the variable $g as an input. [L19] and [L20] in FIG. 9 correspond to [L2] and [L8] in FIG. 7 and have such a form that the lines are called as udf1 and udf2 in which the nested query is clipped as a declare function.

[L23], [L24], and [L26] in FIG. 9 are one obtained by rewriting [L14] in FIG. 7, in which elements are decomposed into let clauses for one operation unit, and the where clause includes only input variable. [L25] and [L27] in FIG. 9 correspond to [L15] in FIG. 7, in which the return clause includes only a variable, and an expression that generates XML is rewritten as a let clause.

When the parsing process by the parser 27 ends, the constraint acquiring unit 28 analyzes the processing results of the parser 27, relaxes the hierarchical conditions of the structured document, and then acquires the constraints of each variable (step S4).

Here, the constraints are an arrangement of all or part of the conditions that the variables need to meet. In this embodiment, as to a variable, the conditions that are to be met by a document set in which elements stored in the variable are included will be described as constraints. For example, when a Bool-type value is stored in a variable, conditions for the value to be "TRUE" are described.

When a plurality of conditions are arranged, the constraint acquiring unit 28 relaxes the conditions in such a form that the dependency of the hierarchical conditions within the structured document is ignored between the respective conditions. For example, when structural conditions /A/B/C and /A/B/D that appear as two conditions that constitute constraints are child elements C and D for the same B in an element set that is designated by /A/B, the conditions are relaxed so that the child elements C and D for different elements of B having the same element names are also met. Due to this, although the use of the constraints only leads to such results that documents which should not be included as targets are included, such a problem is solved by operations which use element IDs of XML.

Figure 10:
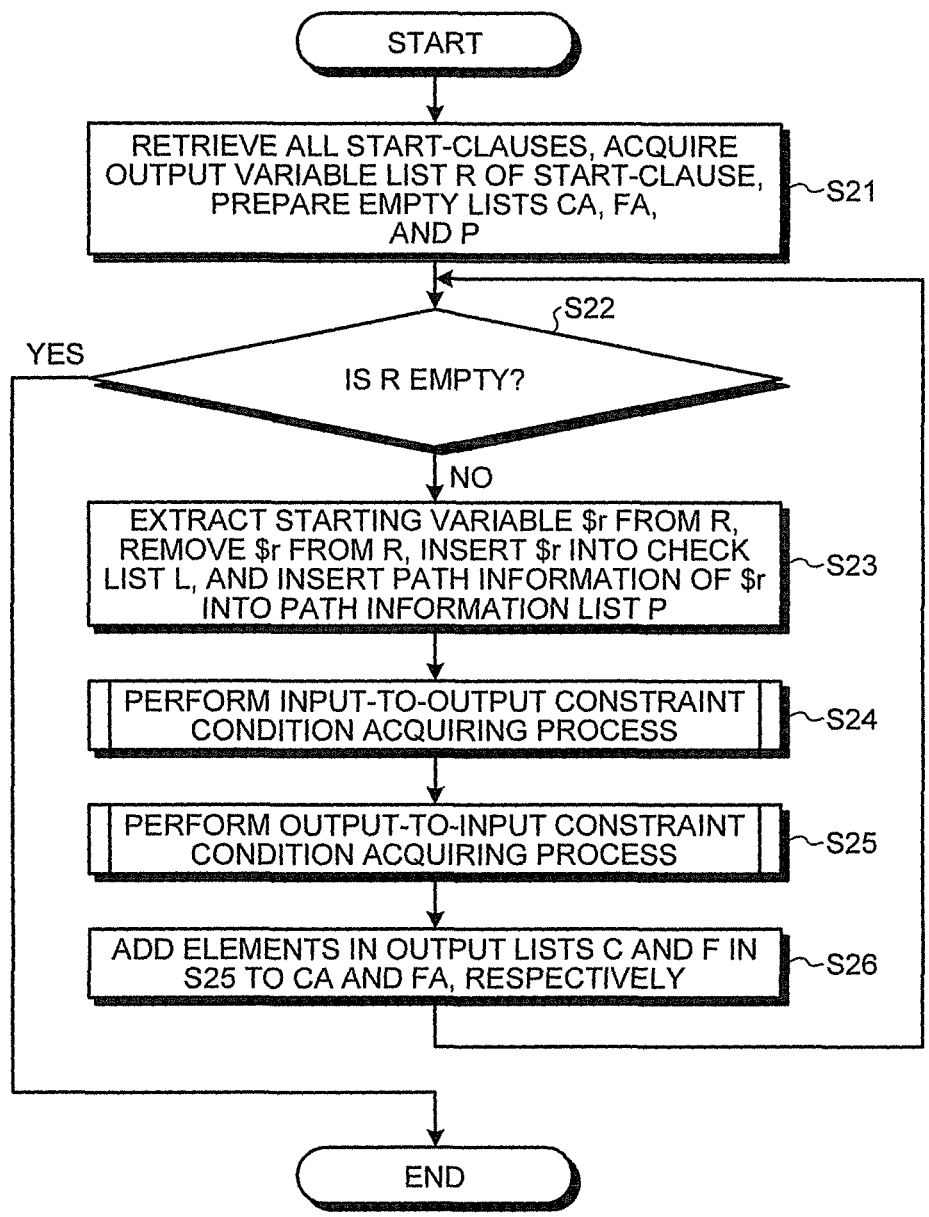
FIG. 10 is a flowchart illustrating a flow of a constraint acquiring process according to the embodiment.

FIG. 10 is a flowchart illustrating the flow of a constraint acquiring process. The constraint acquiring unit 28 first acquires all start-clauses (let clauses) from a parse tree given as an input, extracts the output variables of the start-clauses, and stores the output variables in a list R. Subsequently, the constraint acquiring unit 28 prepares a constraint list CA, a rewriting target list FA, and a path information list P which are the final output. Here, the path information is one in which an element indicated by a variable is indicated by only one or a plurality of structural conditions that start with a "/" or "//" operator (step S21).

Subsequently, the constraint acquiring unit 28 checks elements acquired in step S21 and determines whether the output variable list R is empty (step S22).

When the output variable list R is not empty (No in step S22), the constraint acquiring unit 28 acquires the variable $r which is the starting element from the output variable list R, removes the variable $r from the list, and inserts the variable $r into a list L. Further, the path information of the variable $r is inserted into the path information list P (step S23).

Subsequently, the constraint acquiring unit 28 performs an input-to-output constraint acquiring process of the operation using the list L and the path information list P as an input and outputs a list C that stores constraints, a constraint acquisition target variable list T, a list W that stores the variable serving as the input of the where clause among the variables of the list T, and a list P that stores the path information of the variable of the list T (step S24).

The details of the process of step S24 will be described with reference to the flowchart of FIG. 11. Subsequently, in response to the input of the four lists C, T, W, and P acquired in the process of step S24, the constraint acquiring unit 28 performs an output-to-input constraint acquiring process and outputs a rewriting target variable list F, a constraint information list C, and a path information list P (step S25).

The details of the process of step S25 will be described with reference to the flowchart of FIG. 12. Subsequently, the constraint acquiring unit 28 inserts the respective elements of the constraint information list C and the path information list P obtained in step S25 into the constraint lists CA and FA, respectively (step S26). Subsequently, the flow returns to step S22, and the processes are repeated.

On the other hand, when it is determined in step S22 that the output variable list R is empty (Yes in step S22), the constraint acquiring unit 28 outputs the constraint lists CA and PA and the path information list P acquired in the previous processes and ends the constraint acquiring process.

Figure 11:
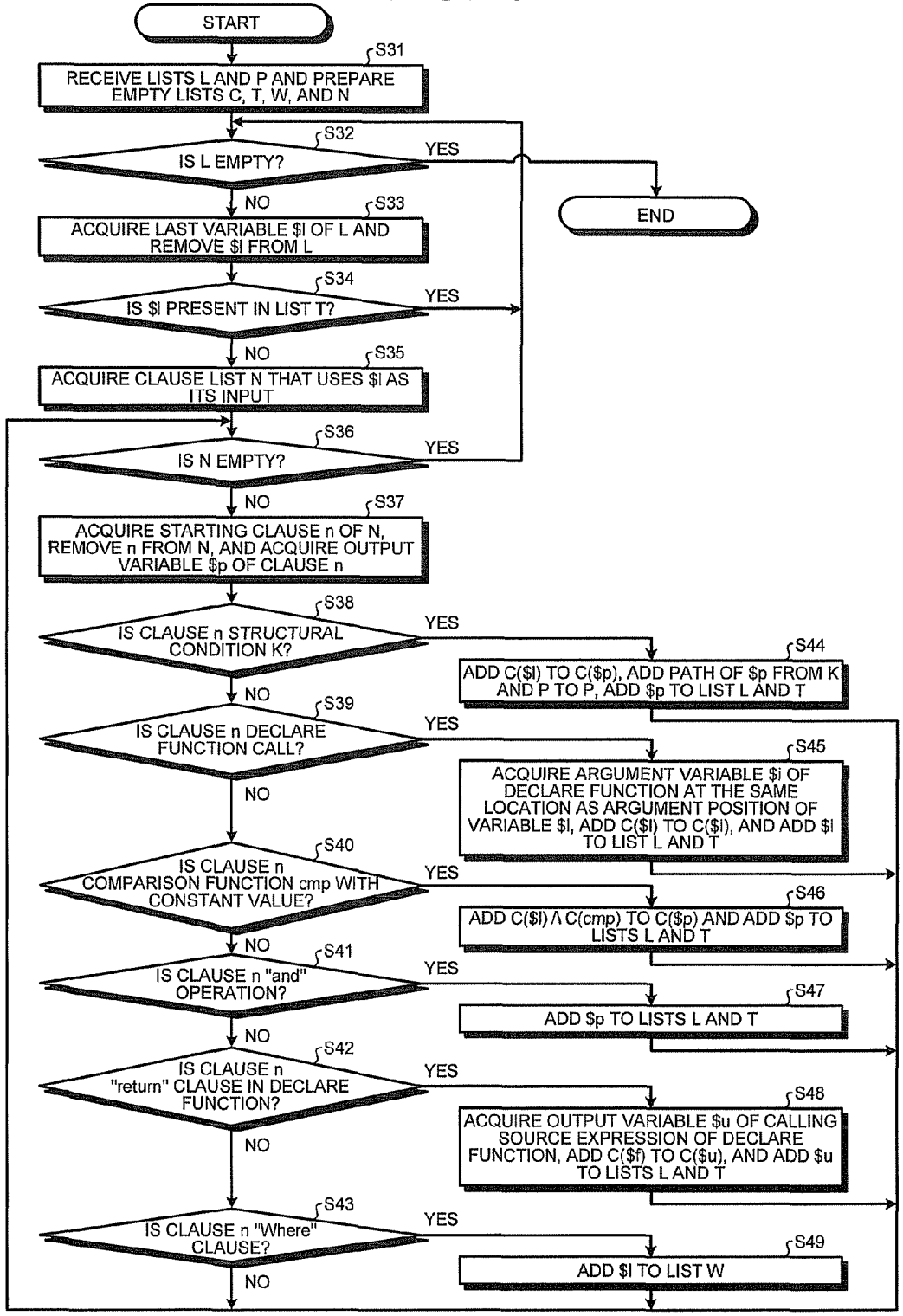
FIG. 11 is a flowchart illustrating a flow of an input-to-output constraint acquiring process according to the embodiment.

FIG. 11 is a flowchart illustrating the flow of the input-to-output constraint acquiring process performed in step S24 of FIG. 10. In the input-to-output constraint acquiring process, first, the constraint acquiring unit 28 receives the list L and the path information list P acquired in step S23 of FIG. 10 as an input and prepares a list W that stores the variable serving as the input of the where clause among the variables of the three lists of the constraint list C, the constraint acquisition target variable list T, and the list T described in step S24 and a list N that stores the FLWOR clauses as empty output lists (step S31). Subsequently, the constraint acquiring unit 28 determines whether the list L is empty (step S32).

When the input list L is not empty (No in step S32), the constraint acquiring unit 28 acquires the variable $l which is the last element of the list L and removes the variable $l from the list (step S33). Subsequently, the constraint acquiring unit 28 determines whether a variable $l is present in the constraint acquisition target variable list T (step S34).

When the variable $l is not present in the constraint acquisition target variable list T (No in step S32), the constraint acquiring unit 28 acquires a for, let, where, orderby, and return clause list N which uses the variable $l as its input (step S35). Subsequently, the constraint acquiring unit 28 determines whether the clause list N is empty (step S36).

When the clause list N is not empty (No in step S36), the constraint acquiring unit 28 acquires a clause n which is the starting element of the clause list N, removes the clause n from the list, and acquires an output variable $p of the clause n (step S37). Subsequently, the constraint acquiring unit 28 determines whether the clause n is a structural condition K (step S38).

When the clause n is the structural condition (Yes in step S38), the constraint acquiring unit 28 adds the constraint C($l) of the variable $l to the constraint C($p) of the variable $p as conditions. Subsequently, the constraint acquiring unit 28 adds the path information of the variable $p to the list P from the structural condition K and the list P. Further, the variable $p is added to the lists L and T (step S44). Subsequently, the flow returns to step S36, and the constraint acquiring unit 28 continues the process.

On the other hand, when the clause n is not the structural condition (No in step S38), the constraint acquiring unit 28 determines whether the clause n is a call of the declare function (step S39).

When the clause n is a call of the declare function (Yes in step S39), the constraint acquiring unit 28 acquires an argument $i of a declare function at the same position as the position of the argument of the variable $l and adds the constraint C($l) of the variable $l to the constraint C($i) of the variable $i as conditions. Subsequently, the constraint acquiring unit 28 adds the variable $i to the lists L and T (step S45). After that, the flow returns to step S36, and the constraint acquiring unit 28 continues the process.

On the other hand, when it is determined in step S39 that the clause n is not a call of the declare function (No in step S39), the constraint acquiring unit 28 determines whether the clause n is a comparison function that compares a constant value with the variable $l (step S40).

When the clause n is a comparison function (Yes in step S40), the constraint acquiring unit 28 adds the constraint C($l) of the variable $l and the constraint C (comparison expression) of the comparison expression to the constraint C($p) of the variable $p as conditions. Subsequently, the constraint acquiring unit 28 adds the variable $p to the lists L and T (step S46). After that, the flow returns to step S36, and the constraint acquiring unit 28 continues the process.

On the other hand, when it is determined in step S40 that the clause n is not the comparison function (No in step S40), the constraint acquiring unit 28 determines whether the clause n is an "and" operation (step S41).

When the clause n is the "and" operation (Yes in step S41), the constraint acquiring unit 28 adds the variable $p to the lists L and T (step S47). Subsequently, the flow returns to step S36, and the constraint acquiring unit 28 continues the process.

On the other hand, when it is determined in step S41 that the clause n is not the "and" operation (No in step S41), the constraint acquiring unit 28 determines whether the clause n is a return clause of the declare function (step S42).

When the clause n is the return clause of the declare function (Yes in step S42), the constraint acquiring unit 28 acquires an output variable $u of a calling source clause of the declare function and adds the constraint C($l) to the constraint C($u) of the variable $u. Subsequently, the variable $u is added to the lists L and T (step S48). Subsequently, the flow returns to step S36, and the constraint acquiring unit 28 continues the process.

On the other hand, when it is determined in step S42 that the clause n is not the return clause of the declare function (No in step S42), the constraint acquiring unit 28 determines whether the clause n is a where clause (step S43).

When the clause n is the where clause (Yes in step S43), the constraint acquiring unit 28 adds the variable $l to the list W (step S49). After that, the flow returns to S36, and the process is continued.

On the other hand, when it is determined in step S43 that the clause n is not the where clause (No in step S43), the flow returns to S36, and the constraint acquiring unit 28 continues the process.

On the other hand, when it is determined in step S36 that the list N is empty (Yes in step S36), the flow returns to S32, and the constraint acquiring unit 28 continues the process.

On the other hand, when it is determined in step S34 that the variable $l is present in the list T (Yes in step S34), the flow returns to step S32, and the constraint acquiring unit 28 continues the process.

On the other hand, when it is determined in step S32 that the list L is empty (Yes in step S32), the constraint acquiring unit 28 outputs the lists C, T, W, and P acquired in the previous processes and ends a higher-to-lower constraint acquiring process.

Figure 12:
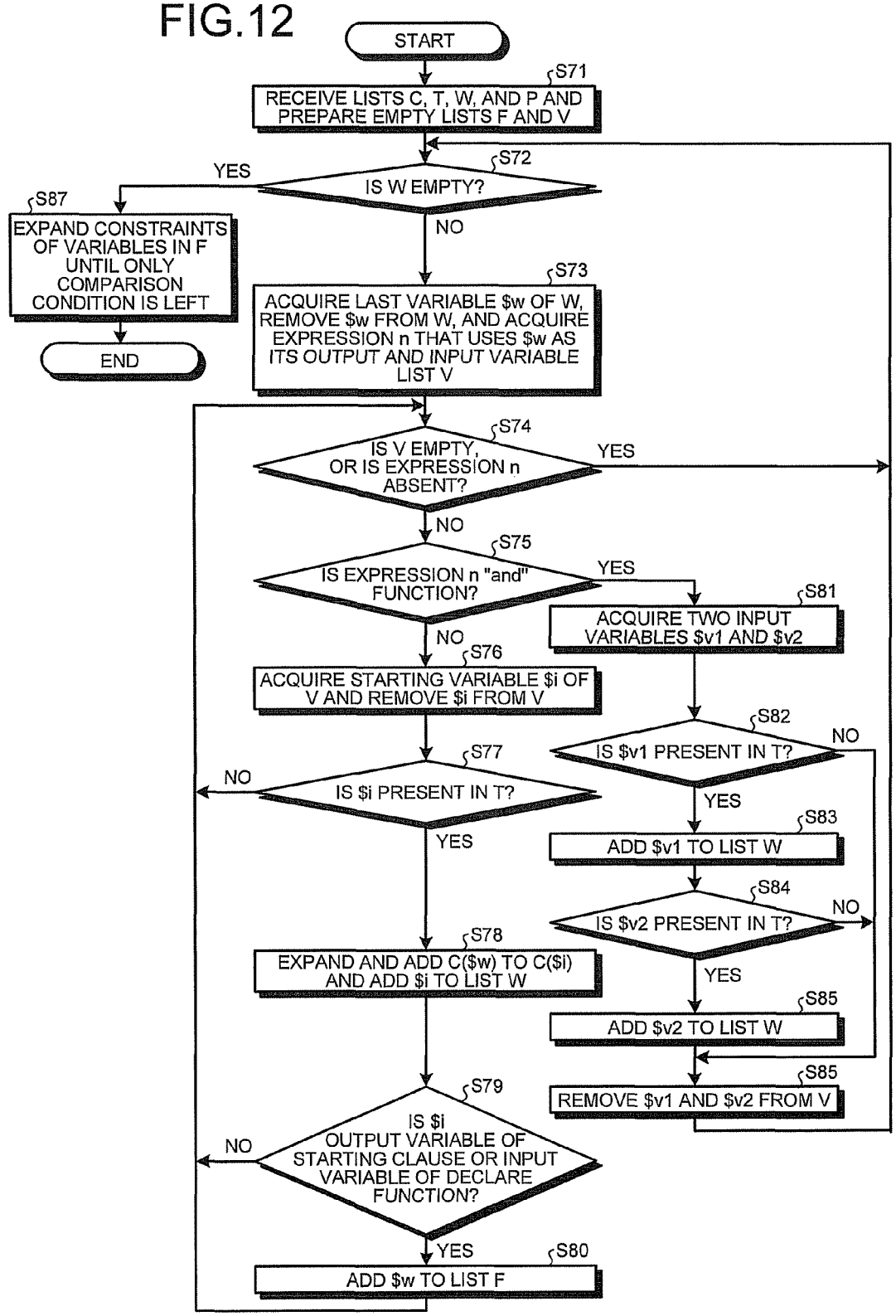
FIG. 12 is a flowchart illustrating a flow of an output-to-input constraint acquiring process according to the embodiment.

FIG. 12 is a flowchart illustrating the flow of the output-to-input constraint acquiring process performed in step S25 of FIG. 10. In the output-to-input constraint acquiring process, first, the constraint acquiring unit 28 receives the lists C, T, W, and P acquired in step S24 in FIG. 10 as an input and prepares the list F described in step S25 and an input variable list V of an expression that is used internally only as empty output lists (step S71). Subsequently, the constraint acquiring unit 28 determines whether the list W is empty (step S72).

When the list W is not empty (No in step S72), the constraint acquiring unit 28 acquires the variable $w which is the last element of the list W, removes the variable $w from the list, and acquires the FLWOR clause n which uses the $w as its output and the input variable list V of the clause n (step S73). Subsequently, the constraint acquiring unit 28 determines whether the list V is empty or the clause n is absent (step S74).

When the list V is not empty and the clause n is present (No in step S74), the constraint acquiring unit 28 determines whether the clause n is an "and" operation (step S75).

When the clause n is the "and" operation (Yes in step S75), the constraint acquiring unit 28 acquires the two input variables $v1 and $v2 of the "and" operation (step S81). Subsequently, the constraint acquiring unit 28 determines whether the variable $v1 is present in the list T (step S82).

When the variable $v1 is present in the list T (Yes in step S82), the constraint acquiring unit 28 adds the variable $v1 to the list W (step S83). Subsequently, it is determined whether the variable $v2 is present in the list T (step S84).

When the variable $v2 is present in the list T (Yes in step S84), the constraint acquiring unit 28 adds the variable $v2 to the list W (step S85). Subsequently, the constraint acquiring unit 28 removes the variables $v1 and $v2 from the list V (step S86). Subsequently, the flow returns to step S72, and the constraint acquiring unit 28 continues the process.

On the other hand, when the variable $v2 is not present in the list T (No in step S84), the flow returns to step S72, and the constraint acquiring unit 28 continues the process.

On the other hand, when the variable $v1 is not present in the list T (No in step S82), the flow returns to step S72, and the constraint acquiring unit 28 continues the process.

On the other hand, when it is determined in step S75 that the clause n is not the "and" operation (No in step S75), the constraint acquiring unit 28 acquires the variable $i at the start of the list V and removes the variable $i from the list V (step S76). Subsequently, the constraint acquiring unit 28 determines whether the variable $i is present in the list T (step S77).

When the variable $i is present in the list T (Yes in step S77), the constraint acquiring unit 28 expands and adds the content of the constraint C($w) of the variable $w to the constraint C($i) of the variable $i. Subsequently, the constraint acquiring unit 28 adds the variable $i to the list W (step S78). Subsequently, the constraint acquiring unit 28 determines whether the variable $i is the output variable of the start-clause or the input variable of the declare function (step S79).

When the variable $i is the output variable of the start-clause or the input variable of the declare function (Yes in step S79), the constraint acquiring unit 28 adds the variable $w to the list F (step S80). Subsequently, the flow returns to step S74, and the constraint acquiring unit 28 continues the process.

On the other hand, when it is determined in step S79 that the variable $i is not the output variable of the start-clause and is not the input variable of the declare function (No in step S79), the flow returns to step S74, and the constraint acquiring unit 28 continues the process.

On the other hand, when it is determined in step S77 that the variable $i is not present in the list T (No in step S77), the flow returns to step S74, and the constraint acquiring unit 28 continues the process.

On the other hand, when it is determined in step S74 that the list V is empty or the clause n is absent (Yes in step S74), the flow returns to step S72, and the constraint acquiring unit 28 continues the process.

On the other hand, when it is determined in step S72 that the list W is empty (Yes in step S72), the constraint acquiring unit 28 expands the constraint C($f) for each variable $f in the list F until conditions other than the comparison condition are removed from the conditions (step S87). Subsequently, the constraint acquiring unit 28 outputs the lists C, F, and P acquired in the previous processes and ends a lower-to-upper constraint acquiring process.

Here, an overview of the process when the constraint acquiring process is performed using the syntactic analysis results illustrated in FIG. 9 will be described with reference to FIGS. 10 to 15.

First, the constraint acquiring unit 28 receives the syntactic analysis results of FIG. 9 as an input, searches all clauses to acquire [L17] in FIG. 9 as a start-clause, and stores an output variable $g in the list R. Subsequently, the constraint acquiring unit 28 prepares empty lists CA, FA, and P (step S21). Subsequently, the constraint acquiring unit 28 extracts the variable $g (=variable $r) which is the starting element from the list R, removes the variable $g from the list R, and stores the variable $g in a check list L. Further, the constraint acquiring unit 28 stores the path information P($g)=/of the variable $g in the list P (steps S22 and S23). Subsequently, the constraint acquiring unit 28 performs an input-to-output constraint acquiring process using the check list L and the path information P as an input (step S24).

Here, step S24 will be described in detail with reference to FIG. 11. First, the constraint acquiring unit 28 receives the list L in which the variable $g is stored and the path information P in which the information on P($g) is stored as an input and prepares empty lists C, T, W, and N (step S31).

Subsequently, since the variable $g is extracted from the check list L and removed, and the variable $g is not present in the list T, the constraint acquiring unit 28 stores the clause [L18] which uses the variable $g as its input in the list N (steps S32 to S35).

Subsequently, the constraint acquiring unit 28 acquires and removes the clause [L18] from the list N and acquires an output variable $h (steps S36 and S37). Subsequently, since the clause [L18] is the structural condition that designates the hierarchical structure, the constraint acquiring unit 28 adds the condition C($g) to the condition C($h) and stores the same in the list P as the path information P($h)=/book of the variable $h from the structural condition $g/book and P($g)=/on [L18]. Further, the constraint acquiring unit 28 stores the variable $h in the lists L and T (steps S38 and S44).

Subsequently, since the list N is empty, the constraint acquiring unit 28 extracts and removes the variable $h from the check list L to acquire L19 to L22 which are the clauses that use the variable $h as their input and stores the clauses L19 to L22 in the list N (steps S36 and S32 to S35). Subsequently, since the start-clause L19 of the list N is a call of the declare function, the constraint acquiring unit 28 acquires the argument variable $h1 of the declare function corresponding to the variable $h and adds the constraint C($h) of the variable $h to the constraint C($h1) of the variable $h1. Further, the constraint acquiring unit 28 adds the variable $h1 to the lists L and T (steps S36 to S39 and S45).

Subsequently, since the start-clause L20 of the list N is a call of the declare function, the constraint acquiring unit 28 acquires an argument variable $h2 of the declare function corresponding to the variable $h and adds the constraint C($h) of the variable $h to the constraint C($h2) of the variable $h2. Further, the constraint acquiring unit 28 adds the variable $h2 to the lists L and T (steps S36 to S39 and S45).

Subsequently, since the start-clause L21 of the list N is a structural condition, the constraint acquiring unit 28 adds the condition C($h) to the condition C($k) and stores the path information P($k)=/book/@year in the list P from the structural condition $h/@year and P($h) on [L21]. Further, the constraint acquiring unit 28 stores the variable $k in the lists L and T (steps S36 to S38 and S44).

Subsequently, since the start-clause L22 of the list N is a structural condition, the constraint acquiring unit 28 adds the condition C($h) to the condition C($l) and stores the path information P($l)=/book/title in the list P. Further, the constraint acquiring unit 28 stores the variable $l in the lists L and T (steps S36 to S38 and S44).

Subsequently, since the list N is empty, the constraint acquiring unit 28 acquires the variable $l from the list L to acquire the clause L25 which uses the variable $l as its input and stores the clause L25 in the list N (steps S36 and S32 to S35). Subsequently, since the start-clause L25 of the list N does not meet any of the conditions of steps S37 to S43, the constraint acquiring unit 28 acquires the variable $k from the list L again, removes the variable $k to acquire the clause L23 that uses the variable $k as its input, and stores the clause L23 in the list N (steps S36 to S43, S36, and S32 to S35).

Subsequently, since the start-clause L23 of the list N is a comparison expression, the constraint acquiring unit 28 adds a constraint C($k)∧ ($k<=1999) of the variable $k to the constraint of the output variable $m on L23. Further, the constraint acquiring unit 28 adds the variable $m to the lists L and T (steps S36 to S40 and S46).

Subsequently, since the list N is empty, the constraint acquiring unit 28 acquires the variable $m from the list L to acquire the clause L24 that uses the variable $m as its input, and stores the clause L24 in the list N (steps S36 and S32 to S35).

Subsequently, since the start-clause L24 of the list N is an "and" operation, the constraint acquiring unit 28 adds the output variable $n to the lists L and T (steps S36 to S41 and S47).

Subsequently, since the list N is empty, the constraint acquiring unit 28 acquires the variable $n from the list L to acquire the clause L26 that uses the variable $n as its input and stores the clause L26 in the list N (steps S36 and S32 to S35). Subsequently, since the clause L26 is a where clause, the constraint acquiring unit 28 adds the variable $n to the list W (steps S36 to S43 and S49).

Subsequently, since the list N is empty, the constraint acquiring unit 28 acquires the variable $h2 from the list L to acquire the clause L12 that uses the variable $h2 as its input and stores the clause L12 in the list N (steps S36 and S32 to S35). Subsequently, since the start-clause L12 of the list N is a structural condition, the constraint acquiring unit 28 adds the condition C($h2) to the constraint C($a) of the output variable $a and stores the path information P($a)=/book/section/p in the list P. Further, the constraint acquiring unit 28 stores the variable $a in the lists L and T (steps S36 to S38 and S44).

Subsequently, since the list N is empty, the constraint acquiring unit 28 acquires the variable $a from the list L to acquire the clauses L13 and L15 that use the variable $a as their input (steps S36 and S32 to S35). Since the starting element L13 of the list N is a comparison expression, the constraint acquiring unit 28 adds a constraint C($a)∧ (Contains($a, "XML")) of the variable $a to the constraint of the output variable $b on L13. Further, the constraint acquiring unit 28 adds the variable $b to the lists L and T (steps S36 to S40 and S46).

Subsequently, since the starting element L15 of the list N is a return clause of a declare function, the constraint acquiring unit 28 acquires the output variable $j of the calling source clause L20 and adds the condition C($a) to the constraint C($j) of the variable $j. Subsequently, the constraint acquiring unit 28 adds the variable $j to the lists L and T (steps S36 to S42 and S48).

Subsequently, since the list N is empty, the constraint acquiring unit 28 acquires the variable $j from the list L to acquire the clause L25 that uses the variable $j as its input (steps S36 and S32 to S35). Subsequently, since the start-clause L25 of the list N does not meet any of the conditions of steps S37 to S43, the constraint acquiring unit 28 acquires and removes the variable $b from the list L again to acquire the clause L14 that uses the variable $b as its input (steps S36 to S43, S36, and S32 to S35). Subsequently, since the clause L14 is a where clause, the constraint acquiring unit 28 adds the variable $b to the list W (steps S36 to S43 and S49).

Subsequently, since the list N is empty, the constraint acquiring unit 28 acquires the variable $h1 from the list L to acquire the clause L2 that uses the variable $h1 as its input and stores the clause L2 in the list N (steps S36 and S32 to S35). Subsequently, since the start-clause L2 of the list N is a structural condition, the constraint acquiring unit 28 adds the condition C($h1) to the constraint C($x) of the output variable $x and stores the path information P($x)=/book/author in the list P. Further, the constraint acquiring unit 28 stores the variable $x in the lists L and T (steps S36 to S38 and S44).

Subsequently, since the list N is empty, the constraint acquiring unit 28 acquires and removes the variable $x from the list L to acquire the clauses L3, L4, and L9 that use the $x as their input (steps S36 and S32 to S35).

Subsequently, since the start-clause L3 of the list N is a structural condition, the constraint acquiring unit 28 adds the condition C($x) to the constraint C($u) of the output variable $u and stores the path information P($u)=/book/author/last in the list P. Further, the constraint acquiring unit 28 stores the variable $u in the lists L and T (steps S36 to S38 and S44).

Subsequently, since the start-clause L4 of the list N is a structural condition, the constraint acquiring unit 28 adds the condition C($x) to the constraint C($v) of the output variable $v and stores the path information P($v)=/book/author/first in the list P. Further, the constraint acquiring unit 28 stores the variable $v in the lists L and T (steps S36 to S38 and S44).

Subsequently, since the start-clause L9 of the list N is a return clause of a declare function, the constraint acquiring unit 28 acquires the output variable $i of the calling source clause L19 and adds the condition C($x) to the constraint C($i) of the variable $i. Subsequently, the constraint acquiring unit 28 adds the variable $i to the lists L and T (steps S36 to S42 and S48).

Subsequently, since the list N is empty, the constraint acquiring unit 28 acquires the variable $i from the list L to acquire the clause L24 that uses the variable $i as its input (steps S36 and S32 to S35). Subsequently, since the clause L24 is an "and" operation, the constraint acquiring unit 28 adds the output variable $n to the lists L and T (steps S36 to S41 and S47).

Subsequently, since the list N is empty, the constraint acquiring unit 28 acquires and removes the variable $n from the list L. Since the variable $n is present in the list T, the constraint acquiring unit 28 returns to the list L again, acquires and removes the variable $v from the list L to acquire the clause L6 that uses the variable $v as its input, and stores the clause L6 in the list N (steps S36, S32 to S34, and S32 to S35).

Subsequently, since the starting element L6 of the list N is a comparison expression, the constraint acquiring unit 28 adds the constraint C($v)∧ ($v="Dan") of the variable $v to the constraint of the output variable $z on L6. Further, the constraint acquiring unit 28 adds the variable $z to the lists L and T (steps S36 to S40 and S46).

Subsequently, since the list N is empty, the constraint acquiring unit 28 acquires the variable $z from the list L to acquire the clause L7 that uses the variable $z as its input (steps S36 and S32 to S35). Subsequently, since the clause L7 is an "and" operation, the constraint acquiring unit 28 adds the output variable $w to the lists L and T (steps S36 to S41 and S47).

Subsequently, since the list N is empty, the constraint acquiring unit 28 acquires the variable $w from the list L to acquire the clause L8 that uses the variable $w as its input (steps S36 and S32 to S35). Subsequently, since the clause L8 is a where clause, the constraint acquiring unit 28 adds the variable $z to the list W (steps S36 to S43 and S49).

Subsequently, since the list N is empty, the constraint acquiring unit 28 acquires the variable $u from the list L to acquire the clause L5 that uses the variable $u as its input (steps S36 and S32 to S35). Subsequently, since the starting element L5 of the list N is a comparison expression, the constraint acquiring unit 28 adds the constraint C($u) ∧ ($u="Suciu") of the variable $u to the constraint of the output variable $y on L5. Further, the constraint acquiring unit 28 adds the variable $y to the lists L and T (steps S36 to S40 and S46).

Subsequently, since the list N is empty, the constraint acquiring unit 28 acquires and removes the variable $y from the list L to acquire the clause L7 that uses the variable $y as its input (steps S36 and S32 to S35). Subsequently, since the clause L7 is an "and" operation, the constraint acquiring unit 28 adds the output variable $w to the lists L and T (steps S36 to S41 and S47).

Subsequently, since the list N is empty, the constraint acquiring unit 28 acquires and removes the variable $w from the list L. Since the variable $w is present in the list T, the flow returns to the list L again (steps S36 and S32 to S34). Subsequently, since the list L is empty, the constraint acquiring unit 28 ends the input-to-output constraint acquiring process. The constraint acquiring unit 28 outputs the list W that includes the variables $n, $b, and $w, the constraint information list C illustrated in FIG. 13, the path information list P illustrated in FIG. 14, and the constraint acquisition target variable list T illustrated in FIG. 15, and returns to step S24 of FIG. 10.

Subsequently, the constraint acquiring unit 28 performs an output-to-input constraint acquiring process using the lists W, C, P, and T as an input (step S25).

Here, step S25 will be described in detail with reference to FIG. 12. First, the constraint acquiring unit 28 receives the lists W, C, P, and T as an input and prepares empty lists F and V (step S71).

Subsequently, the constraint acquiring unit 28 extracts the variable $w from the end of the list W and removes the variable $w from the list W to acquire the clause [L7] that uses the variable $w as its output and a list V that stores the variables $y and $z (steps S72 and S73). Subsequently, since the clause [L7] is an "and" operation that has an argument, and both of the two input variables $y and $z are present in the list T, the constraint acquiring unit 28 stores the variables $y and $z in the list W (steps S74, S75, and S81 to S86).

Subsequently, the constraint acquiring unit 28 extracts and removes the variable $z from the list W to acquire the clause [L6] that uses the variable $z as its output and the list V that stores the variable $v (steps S72 and S73). Subsequently, since the clause [L6] is not an "and" operation, the constraint acquiring unit 28 acquires the input variable $v and removes the variable $v from the list V. Since the variable $v is present in the list T, the constraint acquiring unit 28 adds the condition C($z) to the constraint C($v). In this case, since the condition C($z) is expanded and added to the form on the right side of "=" of [13] of FIG. 13, it is expanded to C($v)=(C($v) ∧ ($v="Dan") and is further expanded to C($v)=($v="Dan").

Subsequently, the constraint acquiring unit 28 adds the variable $v to the list W (steps S73 to S78). Subsequently, since the variable $v is not the output variable of the start-clause or the input variable of the declare function, and the list V is empty, the constraint acquiring unit 28 returns to step S72 (steps S79 and S74).

Subsequently, the constraint acquiring unit 28 acquires the variable $v from the list W and removes the same from the list W to acquire the clause [L4] that uses the variable $v as its output and the list V that stores the variable $x (steps S72 and S73). Subsequently, since the clause [L4] is not an "and" operation, the constraint acquiring unit 28 acquires the input variable $x. Since the variable $x is present in the list T, the condition C($v) is added to the constraint C($x). In this case, since the condition C($v) is expanded and added, C($x)=C ($h1)∧ ($v="Dan") is obtained. Further, the constraint acquiring unit 28 adds the variable $x to the list W and returns to step S72 (steps S74 to S79 and S74).

Subsequently, the constraint acquiring unit 28 acquires the variable $x from the list W and removes the same from the list W to acquire the clause [L2] that uses the variable $x as its output and the list V that stores the variable $h1 (steps S72 and S73). The clause [L2] expands and adds the condition C($x) to the condition C($h1) to obtain C($h1)=C($h) ∧ ($v="Dan"). Further, the constraint acquiring unit 28 adds the variable $h1 to the list W. Since the variable $h1 is the input variable of the declare function, the constraint acquiring unit 28 adds the variable $h1 to the list F and returns to step S72 (steps S74 to S80 and S74).

Subsequently, the constraint acquiring unit 28 acquires the variable $h1 from the list W and removes the same from the list W, and then, returns to step S72 since a clause that uses the variable $h1 as its input is not present (steps S72 to S74).

Subsequently, the constraint acquiring unit 28 acquires the variable $y from the list W and removes the same from the list W to acquire the clause [L5] that uses the variable $y as its output and the list V that stores the variable $u (steps S72 and S73). Subsequently, since the clause [L5] is not an "and" operation, the constraint acquiring unit 28 acquires the input variable $u. Since the variable $u is present in the list T, the condition C($y) is added to the constraint C($u). In this case, since the condition C($y) is expanded and added to the condition C($u), C($u)=C($x)∧ ($u="Suciu") is obtained. Further, the constraint acquiring unit 28 adds the variable $u to the list W and returns to step S72 (steps S74 to S79 and S74).

Subsequently, the constraint acquiring unit 28 acquires the variable $u from the list W and removes the same from the list W to acquire the clause [L3] that uses the variable $u as its output and the list V that stores the variable $x (steps S72 and S73). Subsequently, since the clause [L3] is not an "and" operation, the constraint acquiring unit 28 acquires the input variable $x. Since the variable $x is present in the list T, the condition C($u) is added to the constraint C($x). In this case, since the condition C($u) is expanded and added, C($x)=C ($h1)∧ ($v="Dan")∧ ($u="Suciu") is obtained. Further, the constraint acquiring unit 28 adds the variable $x to the list W, and returns to step S72 (steps S74 to S79 and S74).

Subsequently, the constraint acquiring unit 28 acquires the variable $x from the list W and removes the same from the list W to acquire the clause [L2] that uses the variable $x as its output and the list V that stores the variable $h1 (steps S72 and S73). Subsequently, since the clause [L2] is not an "and" operation, the constraint acquiring unit 28 acquires the input variable $h1. Since the variable $h1 is present in the list T, the condition C($x) is added to the constraint C($h1). In this case, since the condition C($x) is expanded and added, C($h1)=C ($h)∧ ($v="Dan")∧ ($u="Suciu") is obtained. Further, the constraint acquiring unit 28 adds the variable $h1 to the list W. Since the variable $h1 is the input variable of the declare function, the constraint acquiring unit 28 adds the variable $h1 to the list F, and then, returns to step S72 (steps S74 to S80 and S74).

Subsequently, the constraint acquiring unit 28 acquires the variable $b from the list W and removes the same from the list W to acquire the clause [L13] that uses the variable $b as its output and the list V that stores the variable $a (steps S72 and S73). Subsequently, since the clause [L13] is not an "and" operation, the constraint acquiring unit 28 acquires the input variable $a. Since the variable $a is present in the list T, the condition C($b) is added to the constraint C($a). In this case, since the condition C($b) is expanded and added, C($a)=C ($h2)∧ (contains($a, "XML")) is obtained. Further, the constraint acquiring unit 28 adds the variable $a to the list W, and returns to step S72 (steps S74 to S79 and S74).

Subsequently, the constraint acquiring unit 28 acquires the variable $a from the list W and removes the same from the list W to acquire the clause [L12] that uses the variable $a as its output and the list V that stores the variable $h2 (steps S72 and S73). Subsequently, since the clause [L12] is not an "and" operation, the constraint acquiring unit 28 acquires the input variable $h2. Since the variable $h2 is present in the list T, the condition C($a) is added to the constraint C($h2). In this case, since the condition C($a) is expanded and added, C($h2)=C ($h)∧ (contains ($a, "XML")) is obtained. Further, the constraint acquiring unit 28 adds the variable $h2 to the list W and the variable $a to the list F, and then, returns to step S72 (steps S74 to S80 and S74).

Subsequently, the constraint acquiring unit 28 acquires the variable $h2 from the list W and removes the same from the list W, and the flow returns to step S72 since a clause that uses the variable $h2 as its output is not present (steps S72 to S74).

Subsequently, the constraint acquiring unit 28 extracts the variable $n from the list W and removes the same from the list W to acquire the clause [L24] that uses the variable $n as its output and the list V that stores the variables $i and $m (steps S72 and S73). Subsequently, since the clause [L24] is an "and" operation that has an argument, and both of the two input variables $i and $m are present in the list T, the constraint acquiring unit 28 stores the variables $i and $m in the list W (steps S74, S75, and S81 to S86).

Subsequently, the constraint acquiring unit 28 extracts the variable $m from the list W and removes the same from the list W to acquire the clause [L23] that uses the variable $m as its output and the list V that stores the variable $k (steps S72 and S73). Subsequently, since the clause [L23] is not an "and" operation, the constraint acquiring unit 28 acquires the input variable $k. Since the variable $k is present in the list T, the condition C($y) is added to the constraint C($k). In this case, since the condition C($m) is expanded and added, C($k)=C ($h)∧ C($k<=1999) is obtained. Further, the constraint acquiring unit 28 adds the variable $k to the list W and returns to step S72 (steps S74 to S79 and S74).

Subsequently, the constraint acquiring unit 28 acquires the variable $k from the list W and removes the same from the list W to acquire the clause [L21] that uses the variable $k as its output and the list V that stores the variable $h (steps S72 and S73). Subsequently, since the clause [L21] is not an "and" operation, the constraint acquiring unit 28 acquires the input variable $h. Since the variable $h is present in the list T, the condition C($k) is added to the constraint C($h). In this case, since the condition C($k) is expanded and added, C($h)=C ($g)∧ C($k<=1999) is obtained. Further, the constraint acquiring unit 28 adds the variable $h to the list W and returns to step S72 (steps S74 to S79 and S74).

Subsequently, the constraint acquiring unit 28 acquires the variable $h from the list W and removes the same from the list W to acquire the clause [L18] that uses the variable $h as its output and the list V that stores the variable $g (steps S72 and S73). Subsequently, since the clause [L18] is not an "and" operation, the constraint acquiring unit 28 acquires the input variable $g. Since the variable $g is present in the list T, the condition C($h) is added to the constraint C($g). In this case, since the condition C($h) is expanded and added, C($g)=C ($k<=1999) is obtained. Further, the variable $g is added to the list W. Since the variable $g is the output variable of the start-clause, the constraint acquiring unit 28 adds the variable $h to the list F and returns to step S72 (steps S74 to S80 and S74).

Subsequently, the constraint acquiring unit 28 acquires the variable $g from the list W and removes the same from the list W to acquire the clause [L17] that uses the variable $g as its output and an empty list V (steps S72 and S73). Since the list V is empty, the constraint acquiring unit 28 returns to step S72 (step S74).

Subsequently, the constraint, acquiring unit 28 extracts the variable $i from the list W and removes the same from the list W to acquire the clause [L19] that uses the variable $i as its output and the list V that stores the variable $h (steps S72 and S73). Subsequently, since the clause [L19] is not an "and" operation, the constraint acquiring unit 28 acquires the input variable $h. Since the variable $h is present in the list T, the condition C($i) is added to the constraint C($h). In this case, since the condition C($i) is expanded and added, C($h)=C ($g)∧ C($k<=1999)∧ C($u="Suciu")∧ C($v="Dan") is obtained. Further, the constraint acquiring unit 28 adds the variable $h to the list W and returns to step S72 (steps S74 to S79 and S74).

Subsequently, the constraint acquiring unit 28 acquires the variable $h from the list W and removes the same from the list W to acquire the clause [L18] that uses the variable $h as its output and the list V that stores the variable $g (steps S72 and S73). Subsequently, since the clause [L18] is not an "and" operation, the constraint acquiring unit 28 acquires the input variable $g. Since the variable $g is present in the list T, the condition C($h) is added to the constraint C($g). In this case, since the condition C($h) is expanded and added, C($g)=C ($k<=1999)∧ C($u="Suciu")∧ C($v="Dan") is obtained. Further, the constraint acquiring unit 28 adds the variable $g to the list W. Since the variable $g is the output variable of the start-clause, the constraint acquiring unit 28 adds the variable $h to the list F and returns to step S72 (steps S74 to S80 and S74).

Subsequently, the constraint acquiring unit 28 acquires the variable $g from the list W and removes the same from the list W to acquire the clause [L17] that uses the variable $g as its output and an empty list V (steps S72 and S73). Since the list V is empty, the constraint acquiring unit 28 returns to step S72 (step S74).

Subsequently, since the list W is empty, the constraint acquiring unit 28 expands the constraints C($x), C($a), and C($h) of the three variables $x, $a, and $h that are registered in the list F until only a comparison condition is left. Since the condition C($g) is made up of a comparison condition only, only a comparison condition is left by propagating this condition (steps S72 and S87). In this manner, the output-to-input constraint acquiring process ends. The constraint acquiring unit 28 outputs the list F that includes the variables $x, $a, and $h, the constraint information list C illustrated in FIG. 16, and the path information list P illustrated in FIG. 14 and returns to step S25 of FIG. 10.

Subsequently, the constraint acquiring unit 28 adds the elements of the constraint information list C and the path information list P obtained in step S25 to the lists CA and PA, respectively. Since the lists CA and PA are empty lists, the lists are identical to the lists C and P (step S26).

Subsequently, since the list R is empty, the constraint acquiring unit 28 ends the constraint acquiring process (step S22). The constraint acquiring unit 28 outputs the list F that includes the variables $x, $a, and $h, the constraint information list CA illustrated in FIG. 16, and the path information list PA illustrated in FIG. 14, and returns to step S3 of FIG. 8.

Subsequently, when the constraint acquiring process of the constraint acquiring unit 28 ends, the parse tree rewriting unit 29 receives the output of the constraint acquiring process and performs a parse tree rewriting process based on the constraint (step S4). The parse tree rewriting unit 29 moves the obtained constraint so as to be performed at the first of the process of XQuery and perform rewriting so that the same results as those before rewriting are obtained by placing the product between the IDs of a set of elements obtained with the moved expression and the IDs of a set of elements obtained by tracing the structured document from the top at the original position of the constraint. An example of the rewriting process of the parse tree rewriting unit 29 will be described with reference to FIGS. 17 to 18.

FIG. 17 is an example of a rewriting template used in the flowchart of FIG. 18. FIG. 17 includes the items of "template name", "base template", and "parameter". The "template name" is a name that uniquely designates a template. The "base template" is a template that serves as a base of a clause to be created, and [A] to [E] are parameter portions that can be changed. The "parameter" is a portion that describes the content of a value that is embedded in the base template, and a plurality of parameters are described in a format of "[F]:G". Here, [F] is the name of a location that corresponds to [A] to [E] of the base template, and "G" describes the value that is inserted in [F]. In FIG. 17, the template TP1 is a base template and describes two declare variable clauses that start with "declare variable". The portion surrounded by [ ] is the grammar of XQuery that indicates a filtering condition for the parameter [Y]. [$X]/fn:root(.) is a function that acquires a document element on top of a structured document for each element stored in the variable $X. The template TP1 accepts a comparison conditional expression d as its input and treats the structural condition P($e) of a variable $e described in the expression d, a comparison operator in the expression d, and a comparison constant value in the expression d as parameters [Y], [Z], and [V]. The template TP2 is made up of one let clause, and $[X] intersect $[Y] is an operation that takes the product of the element sets of $[X] and $[Y]. The template TP3 is made up of one let clause, and is a clause that takes the products for all elements [$e[1] . . . $e[n]] of the input list E by an intersect operation. Σ represents a repetition of i from 2 to n. The template TP4 is a filter expression that is embedded in the middle of a clause and is a clause that acquires a document element at the top of a structured document for each element stored in the variable to the left of the template TP4 and takes the product of the document element and $[X].

FIG. 18 is a flowchart illustrating the flow of a parse tree rewriting process. First, the parse tree rewriting unit 29 receives the rewriting target variable list F given as an input, the constraint information list C for the variable in the list F, and the path information list P and prepares empty lists A, B, D, and E (step S101). Subsequently, the parse tree rewriting unit 29 determines whether the list P is empty (step S102).

When the list P is not empty (No in step S102), the parse tree rewriting unit 29 acquires a path expression P($1) which is the starting element of the list P and removes the same from the list P (step S103). Subsequently, it is determined whether the variable $1 is present in the list F (step S104).

When the variable $1 is present in the list F (Yes in step S104), the parse tree rewriting unit 29 acquires the constraint C($1) for the variable $1 from the list C (step S105). Subsequently, the parse tree rewriting unit 29 determines whether a variable of which the constraint is identical to the condition C($1) in the list A (step S106).

When the variable of which the constraint is identical to the condition C($1) is not present in the list A (No in step S106), the parse tree rewriting unit 29 adds the variable $1 to the list A and acquires a list D in which the conditions of C($1) that are not present in the list B are collected. Subsequently, the parse tree rewriting unit 29 adds all elements of the list D to the list B (step S107).

Subsequently, the parse tree rewriting unit 29 acquires the starting element d of the list D and removes the element d from the list D (step S108). The parse tree rewriting unit 29 applies the condition d to the parameters of the template TP1 of FIG. 18 as an input and adds the condition d to a query. Subsequently, the parse tree rewriting unit 29 rewrites the clause in which the condition d is described into one in which the condition d is applied to the template TP2 of FIG. 18 (step S109). Subsequently, the parse tree rewriting unit 29 determines whether the list D is empty (step S110).

When the list D is empty (Yes in step S110), the parse tree rewriting unit 29 determines whether the number of elements in the list E is two or more (step S111).

When the number of elements in the list E is two or more (Yes in step S111), the parse tree rewriting unit 29 applies the list E to the parameters of the template TP3 of FIG. 18 as an input and adds the list E to the query. The output variable of the addition result is set to $3 (step S112). Subsequently, the parse tree rewriting unit 29 proceeds to step S113 and continues the process.

On the other hand, when the number of elements in the list E is one (No in step S111), the parse tree rewriting unit 29 sets the starting element of the list E to $3 (step S116). Subsequently, the parse tree rewriting unit 29 proceeds to step S113 and continues the process.

Subsequently, the parse tree rewriting unit 29 acquires an expression c that outputs the variable $1 (step S113). Subsequently, the parse tree rewriting unit 29 determines whether the input variable $4 of the expression c is an output variable of a start-clause (step S114).

On the other hand, when the input variable $4 of the expression c is the output variable of a start-clause (Yes in step S114), the parse tree rewriting unit 29 rewrites the variable $4 into the variable $3 (step S115). Subsequently, the parse tree rewriting unit 29 proceeds to step S118 and continues the process.

On the other hand, when the input variable $4 of the expression c is not the output variable of a start-clause (No in step S114), the parse tree rewriting unit 29 applies the variable $3 to the parameters of the template TP4 of FIG. 18 as an input and adds the variable $3 to the end of the input variable $4 of the expression c (step S117). Subsequently, the parse tree rewriting unit 29 proceeds to step S118 and continues the process.

Subsequently, the parse tree rewriting unit 29 empties the list E (step S113), returns to step S102, and continues the process.

On the other hand, when the list D is not empty (No in step S110), the parse tree rewriting unit 29 returns to step S108 and continues the process.

On the other hand, when a variable of which the constraint is identical to the condition C($1) in the list A (Yes in step S106), the parse tree rewriting unit 29 returns to step S102 and continues the process.

On the other hand, when the variable $1 is not present in the list F (No in step S104), the parse tree rewriting unit 29 returns to step S102 and continues the process.

On the other hand, when it is determined in step S102 that the list P is empty (Yes in step S102), the parse tree rewriting unit 29 ends the parse tree rewriting process.

Here, the overview of the process when the parse tree rewriting process is performed using the list F that includes the variables $x, $a, and $h, the constraint information list C illustrated in FIG. 16, and the path information list P illustrated in FIG. 14 will be described with reference to FIGS. 17 and 18.

First, the parse tree rewriting unit 29 receives the list F that includes the variables $x, $a, and $h as an input, the constraint information list C illustrated in FIG. 16, and the path information list P illustrated in FIG. 14 and prepares empty lists A, B, D, and E (step S101). Subsequently, the parse tree rewriting unit 29 receives P($h) from the start of the list P and removes the same from the list P (steps S102 and S103).

Subsequently, since the variable $h is present in the list F, the parse tree rewriting unit 29 acquires the constraint C($h) of the variable $h (steps S104 and S102 to S105).

Subsequently, since the list A is empty, the parse tree rewriting unit 29 adds the constraint C($h) ($k<=1999), ($v="Dan"), and ($u="Suciu") to the list A, and since the list B is empty, acquires the list D which includes ($k<=1999), ($v="Dan"), and ($u="Suciu") as its elements (steps S106 and S107).

Subsequently, the parse tree rewriting unit 29 acquires the starting element ($k<=1999) of the list D and removes the same from the list D (step S108). Subsequently, the parse tree rewriting unit 29 gives ($k<=1999) to the template TP1 of FIG. 17 as an input and adds the two declare variable clauses to the query. The structural condition "/book/@year" of the path information P($k) of the variable $k is assigned to the parameter [Y] of the template TP1, a comparison operator "<=" is assigned to the parameter [Z], a value "1999" is assigned to the parameter [V], and new variables $1 and $1_root are assigned to the parameters [X] and [W] so as not to be the same as the variable names which appeared up to now. The added clauses correspond to the clauses [L1] and [L2] of FIG. 19. Subsequently, the parse tree rewriting unit 29 adds the variable $1_root to the list E. Further, the parse tree rewriting unit 29 gives ($k<=1999) to the template TP2 of FIG. 17 as an input and rewrites a clause in which ($k<=1999) is described. A variable $m that stores the condition ($k<=1999) is assigned to the parameter [X] of the template TP2 and the variable $k is assigned to the parameter [Y] and $1 is assigned to a variable $z. The clause [L23] in FIG. 9 is rewritten to the clause [L33] in FIG. 19 (steps S108 and S109).

Subsequently, the process of step S109 is also applied to the remaining elements ($v="Dan") and ($u="Suciu") of the list D. The result of application of the template TP1 to ($v="Dan") corresponds to the clauses [L3] and [L4] in FIG. 19, and the result of the application of the template TP2 corresponds to the clause [L16] in FIG. 19. Moreover, the result of application of the template TP1 to ($u="Suciu") corresponds to the clauses [L5] and [L6] in FIG. 19, and the result of the application of the template TP2 corresponds to the clause [L15] in FIG. 19. The variables $2_root and $3_root are added to the list E (steps S110 and S108 to S109).

Subsequently, since the list D is empty and the number of elements in the list E is three, the parse tree rewriting unit 29 gives the list E to the template TP3 of FIG. 17 as an input and adds one declare variable clause. The number three of elements in the list E is assigned to the parameter [n] of the template TP3, the respective elements $1_root, $2_root, and $3_root of the list E are assigned to the parameters e[1] to e[3], and a new variable $4_root is assigned to the parameter [X] so as not to be the same as the variable name that appeared up to now. The result of application of the template TP3 corresponds to the clause [L9] in FIG. 19 (steps S110 to S112).

Subsequently, since the expression that outputs the variable $h corresponds to the clause [L18] in FIG. 9 and the input variable $g of the clause [L18] is the output variable of the start-clause, the parse tree rewriting unit 29 rewrites the variable $g into the variable $4_root. The rewriting result corresponds to the clause [L28] in FIG. 19 (steps S113 to S115).

Subsequently, the parse tree rewriting unit 29 empties the list E and extracts the information P($k) from the start of the list P (steps S118 and S102 to S103). Since the variables $k and $l of P($k) and P($l) are not present in the list F, the process is skipped (steps S104 and S102 to S103). Subsequently, the parse tree rewriting unit 29 receives the information P($a) from the start of the list P and removes the same from the list P (step S104).

Subsequently, since the variable $a is present in the list F, the parse tree rewriting unit 29 acquires the constraint C($a) of the variable $a (steps S104 and S105).

Subsequently, since the constraint information C($h) of the variable $h in the list A is not identical to the information C($a), the parse tree rewriting unit 29 adds the variable $a to the list A. Subsequently, the parse tree rewriting unit 29 acquires the list D which includes the condition (Contains ($a, "XML")) that is not present in the list B in the information C($a) at its element. Subsequently, the parse tree rewriting unit 29 adds the condition (Contains ($a, "XML")) which is an element of the list D to the list B (steps S106 and S107).

Subsequently, the parse tree rewriting unit 29 acquires the starting element (Contains ($a, "XML")) of the list D and removes the same from the list D (step S108). Subsequently, the parse tree rewriting unit 29 gives the element (Contains ($a, "XML")) to the template TP1 of FIG. 17 as an input and adds two declare variable clauses to the query. The structural condition "/book/section/p" of the path information P($a) of the variable $a is assigned to the parameter [Y] of the template TP1, a comparison operator "contains( )" is assigned to the parameter [Z], a value ""XML"" is assigned to the parameter [V], and new variables $5 and $5_root are assigned to the parameters [X] and [W] so as not to be the same as the variable names that appeared up to now. The added clause corresponds to the clauses [L8] and [L9] in FIG. 19. Subsequently, the parse tree rewriting unit 29 adds the variable $5_root to the list E. Further, the parse tree rewriting unit 29 gives (Contains ($a, "XML")) to the template TP2 of FIG. 17 as an input and rewrites the clause in which (Contains ($a, "XML")) is described. The variable $b that stores (Contains ($a, "XML")) is assigned to the parameter [X] of the template TP2, and the variable $a is assigned to the parameter [Y] and $5 is assigned to a variable $z. The clause [L13] in FIG. 9 is rewritten into the clause [L23] in FIG. 19 (steps S108 and S109).

Subsequently, since the list D is empty, the number of elements in the list E is one, the expression that outputs the variable $a acquires the clause [L12] in FIG. 9, and the input variable $h2 of the clause [L12] is not the output variable of the start-clause, the parse tree rewriting unit 29 gives the variable $5_root to the template TP4 of FIG. 17 as an input to obtain an expression and adds the obtained expression to the end of the input variable $h2 of the clause [L12] in FIG. 9. The variable $5_root is assigned to the parameter [X] of the template TP4, and the added expression corresponds to the clause [L22] in FIG. 19 (steps S110 to S111, S116, S113 to S114, and S117).

Subsequently, the parse tree rewriting unit 29 empties the list E, receives the information P($x) from the start of the list P, and removes the same from the list P (step S104).

Subsequently, since the variable $x is present in the list F, the parse tree rewriting unit 29 acquires the constraint C($x) of the variable $x (steps S104 and S105).

Subsequently, since the constraint information C($h) of the variable $h in the list A is identical to the condition C($x), the parse tree rewriting unit 29 returns to step S102, receives the information P($u) from the start of the list P, and removes the same from the list P (step S106 and S102 to S103). Since the information P($u) and the variables $u and $v of the information P($v) left in the list P are not present in the list F, the flow returns to step S102. Since the list P is empty, the parse tree rewriting process ends (steps S104, S102 to S104, and S102). The parse tree rewriting unit 29 outputs the XQuery of FIG. 19 as a parse tree and returns to step S4 of FIG. 8.

When the parse tree rewriting process of the parse tree rewriting unit 29 ends, the rewritten parse tree is output. The parse tree is expressed in such a form that the grammar of XQuery can be reproduced. Subsequently, the query execution unit 30 performs the process of executing the rewritten parse tree (in this example, the XQuery) (step S5). Since the rewritten parse tree maintains the form of XQuery, the query executing process can be executed by an optional XQuery processing system.

When the query executing process of the query execution unit 30 ends, finally, the search interface unit 26 returns the output of the query execution unit 30 to the client terminal 3 as result data (step S6).

FIG. 20 illustrates the results of execution of the XQuery of FIG. 19 obtained by rewriting the XQuery illustrated in FIG. 7, with respect to the document set in the structured document device illustrated in FIGS. 4 to 6. First, the clauses [L1] to [L6] and [L9] refine the target structured documents that meet the constraint among the structured document set to the structured documents of FIGS. 4 and 5. The process that starts with the clause [L27] is performed on the refined structured documents. Further, only the structured document illustrated in FIG. 4 meets the conditions of the clauses [L15] to [L17]. Thus, the result is output as an XML in which the <title> and <author> elements of FIG. 4 and the <p> element in FIG. 4 that meets the condition of the clause [L24] are combined.

As described with reference to specific examples, according to this embodiment, the server 1 stores the structured document data in the structured document DB 21. Moreover, the server 1 performs syntactic analysis on the input query data from the client terminal 3 when searching for structured document data to generate a parse tree in which one clause is made up of a single operation expression from the input query data, and acquires constraints for a target structured document set by tracing the obtained parse tree in directions from input to output and from output to input. The constraints are relaxed so that the hierarchical structures of the conditions that constitute the constraints do not depend on from each other. When the constraints obtained in this manner are rewritten, the constraints can be simply described as declare variables in mutually independent forms. From the relaxed conditions, the same results as the original conditions can be obtained by taking the product between the input variables before the rewriting and the element IDs. By rewriting in this manner, in such a complex XQuery that includes nested queries, a target structured document set can be rewritten so that refinement can be realized at an early stage. When more strict conditions are to be obtained, double evaluations of the same conditional expression are eliminated by taking the product of element IDs. Thus, since it is only necessary to perform the process of XQuery with respect to the structured document set that is refined at an early stage, it is possible to search at a high speed.

In the embodiment, although the rewriting results are rewritten according to the grammar of the same query as the input, this proposal is not limited to this. For example, the rewriting results may be rewritten into an internal format that the structured document search device uses to generate an execution plan. In this case, the execution order of the relaxed constraints can be optimized in the entire query that includes JOIN (combine operation) and ORDERBY (sort operation). Further, although the element at the top of a structured document has been acquired to describe the refinement by the INTERSECT operation that is present in the syntax of XQuery, this proposal is not limited to this. For example, as in Japanese Laid-open Patent Publication No. 2010-79646, by preparing a function that receives an element list of a structured document as an input and performs an operation on the structured document only that is present in the list, the same function can be implemented even when the INTERSECT operation is not used.

Further, in the embodiment, although the dependency of the hierarchical structures in the structured document that occurs between the respective conditions that constitute the constraints is ignored, this proposal is not limited to this. For example, the structural conditions of which the dependency is ignored may be limited to only a partial hierarchical structure condition. Moreover, the parent-child relation of the hierarchical structure condition may be relaxed to an ancestor-descendant relation, or may be relaxed so as to designate an optional element name. Furthermore, DTDand XML SCHEMA which is the schema information of XML may be used as information for relaxing the constraints.

Furthermore, in the embodiment, although only the "and" condition has been described as an example of an operator that designates a plurality of conditions, this proposal is not limited to this. The same processing may be performed when an "or" condition is included by associating the constraints to the "or" condition.

The function of the server 1 according to the embodiment described above is realized when the CPU 101 which is an arithmetic unit of a computer, for example, executes a structured document management program implemented as an application program.

The structured document management program executed by the server 1 according to the embodiment is provided in a state of being recorded in a computer-readable recording medium 110 such as a CD-ROM, a flexible disk (FD), a CD-R, or a digital versatile disc (DVD) as an installable or executable file, for example, as a computer program product.

Further, the structured document management program executed by the server 1 according to the embodiment may be provided by storing the same on a computer that is connected to the network 2 such as the Internet and downloading the same via the network 2. Moreover, the structured document management program executed by the server 1 according to the embodiment may be provided or distributed via the network 2 such as the Internet. Furthermore, the structured document management program executed by the server 1 according to the embodiment may be provided by being incorporated into the ROM 102 or the like.

The structured document management program executed by the server 1 according to the first embodiment has a module configuration that includes the storage interface unit 24, the search interface unit 26, the parser 27, the constraint acquiring unit 28, the parse tree rewriting unit 29, the query execution unit 30, and the like. As an actual hardware, when the CPU (processor) 101 reads the structured document management program from the HDD 104 or the like and executes the same, the respective units are loaded onto a main storage device (for example, the RAM 103), and the storage interface unit 24, the search interface unit 26, the parser 27, the constraint acquiring unit 28, the parse tree rewriting unit 29, the query execution unit 30, and the like are generated on the main storage device.

According to the structured document management system according to the embodiment described above, syntactic analysis is performed on input query data to extract the hierarchical structure conditions of the elements in a structured document and the conditions of values as constraints. In this case, the hierarchical conditions that are met by the elements of the structured document are relaxed to such a form that elements which are not obtained with the original hierarchical conditions are also included. Thus, it is possible to rewrite the relaxed conditions into such a form that the conditions can be moved between nested subqueries. The relaxed conditions are rewritten by applying a predicative condition that takes the product set of element identifiers so that the same results as the original conditions are obtained. In this way, since refinement of the structured document set can be applied at an early stage, it is possible to search at a high speed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structured document management device comprising:
a processor; and
a memory that stores instructions that when executed by the processor performs operations, comprising:
receiving an input of a structured document having a layered logical structure;
storing the structured document;
receiving an input of query data;
parsing the syntax of the received query data to acquire a parse tree in which the query data is decomposed so as to meet a static single assignment form which is defined such that each variable is assigned exactly once;
acquiring a hierarchical condition that the variables of the parse tree need to meet and constraints that include conditions for values of the respective variables, from the parse tree obtained;
rewriting the query data in such a form that the structured document is refinable by the constraints, based on the constraints obtained from acquiring the hierarchical condition; and
outputting a search result in response to the query data as an input that is rewritten, wherein the acquiring includes acquiring relaxed constraints by relaxing the hierarchical condition under a same element name as the variables so that other variables rather than the variables meet the relaxed hierarchical condition and by adding the relaxed hierarchical condition to the constraints, the element name being a name of a part that constitutes the structured document, and the rewriting includes obtaining, by taking a product between a variable before being rewritten and an element identifier for identifying the part that constitutes the structured document, a same result as the constraints even when the query data is rewritten based on the relaxed constraints.

2. The device according to claim 1, wherein the rewriting includes outputting a rewriting result based on the constraints obtained in the same grammar format as the original query data.

3. A structured document management method comprising:

receiving an input of a structured document having a layered logical structure;

storing the received structured document;

receiving an input of query data;

parsing the syntax of the received query data to acquire a parse tree in which the query data is decomposed so as to meet a static single assignment form which is defined such that each variable is assigned exactly once;

acquiring a hierarchical condition that the Variables of the parse tree need to meet and constraints that include conditions for values of the respective variables, from the parse tree;

rewriting the query data in such a form that the structured document is refinable by the constraints, based on the constraints; and outputting a search result in response to the query data as an input, wherein the acquiring includes acquiring relaxed constraints by relaxing the hierarchical condition under a same element name as the variables so that other variables rather than the variables meet the relaxed hierarchical condition and by adding the relaxed hierarchical condition to the constraints, the element name being a name of a part that constitutes the structured document and the rewriting includes obtaining, by taking a product between a variable before being rewritten and an element identifier for identifying the part that constitutes the structured document, a same result as the constraints even when the query data is rewritten based on the relaxed constraints.

4. A computer program product comprising a non-transitory computer-readable medium containing a program executed by a computer, the program causing the computer to execute:

receiving an input of a structured document having a layered logical structure;

storing the received structured document;

receiving an input of query data;

parsing the syntax of the received query data to acquire a parse tree in which the query data is decomposed so as to meet a static single assignment form which is defined such that each variable is assigned exactly once;

acquiring a hierarchical condition that the variables of the parse tree need to meet and constraints that include conditions for values of the respective variables, from the parse tree;

rewriting the query data in such a form that the structured document is refinable by the constraints, based on the constraints; and outputting a search result in response to the query data as an input, wherein the acquiring includes acquiring relaxed constraints by relaxing the hierarchical condition under a same element name as the variables so that other variables rather than the variables meet the relaxed hierarchical condition and by adding the relaxed hierarchical condition to the constraints, the element name being a name of a part that constitutes the structured document and the rewriting includes obtaining, by taking a product between a variable before being rewritten and an element identifier for identifying the part that constitutes the structured document, a same result as the constraints even when the query data is rewritten based on the relaxed constraints.

* * * * *